United States Patent
Hoover et al.

(10) Patent No.: US 9,685,097 B2
(45) Date of Patent: Jun. 20, 2017

(54) DEVICE AND METHOD FOR DETECTING EATING ACTIVITIES

(71) Applicant: Clemson University, Clemson, SC (US)

(72) Inventors: Adam Hoover, Clemson, SC (US); Eric Muth, Clemson, SC (US); Yujie Dong, Clemson, SC (US); Jenna Scisco, Vernon, CT (US)

(73) Assignee: Clemson University, Clemson, SC (US)

( * ) Notice: Subject to any disclaimer, the term of this patent is extended or adjusted under 35 U.S.C. 154(b) by 224 days.

(21) Appl. No.: 14/314,160

(22) Filed: Jun. 25, 2014

(65) Prior Publication Data

US 2014/0377724 A1    Dec. 25, 2014

Related U.S. Application Data

(60) Provisional application No. 61/839,105, filed on Jun. 25, 2013.

(51) Int. Cl.
G09B 19/00   (2006.01)
G06K 9/00    (2006.01)

(52) U.S. Cl.
CPC ..... G09B 19/0092 (2013.01); G06K 9/00355 (2013.01)

(58) Field of Classification Search
CPC ...... G09B 19/0092; G09B 5/00; G09B 19/00; A61B 2562/0219; A61B 5/681; A61B 5/1123; G06F 19/3418

(Continued)

(56) References Cited

U.S. PATENT DOCUMENTS

| 4,207,673 A | 6/1980 | DiGirolamo et al. |
| 4,321,674 A | 3/1982 | Krames et al. |

(Continued)

FOREIGN PATENT DOCUMENTS

| WO | WO 97/28738 A1 | 8/1997 | |
| WO | WO 2010083196 A1 * | 7/2010 | ........... A61B 5/1123 |

OTHER PUBLICATIONS

Dealing with sensor displacement in motion-based onbody activity recognition systems Kai Kunze—Paul Lukowicz—Proceedings of the 10th international conference on Ubiquitous computing— UbiComp '08—Sep. 2008.*

(Continued)

*Primary Examiner* — Xuan Thai
*Assistant Examiner* — Kristen Shirley
(74) *Attorney, Agent, or Firm* — Dority & Manning, P.A.

(57) ABSTRACT

Devices and methods for detecting an eating activity occurrence are provided. A device includes a sensor for monitoring movement of a portion of an arm of a subject, and a processor in communication with the sensor for collecting raw data associated with movement of the portion of the arm. The processor is configured to process the raw data and form processed data. The processed data includes a determination of whether an eating activity has occurred. A method includes sensing movement of a portion of an arm of a subject, and processing raw data associated with the movement of the portion of the arm of the subject to form processed data. The processed data includes a determination of whether an eating activity has occurred.

19 Claims, 6 Drawing Sheets

(58) Field of Classification Search
USPC .................................................. 434/127, 236
See application file for complete search history.

(56) References Cited

U.S. PATENT DOCUMENTS

| | | | |
|---|---|---|---|
| 4,575,804 | A | 3/1986 | Ratcliff |
| 4,686,624 | A | 8/1987 | Blum et al. |
| 4,823,808 | A | 4/1989 | Clegg et al. |
| 4,911,256 | A | 3/1990 | Attikiouzel |
| 4,914,819 | A | 4/1990 | Ash |
| 4,975,682 | A | 12/1990 | Kerr et al. |
| 5,398,688 | A | 3/1995 | Laniado |
| 5,421,089 | A | 6/1995 | Dubus et al. |
| 5,548,283 | A | 8/1996 | Martin |
| 5,563,850 | A | 10/1996 | Hanapole |
| 5,864,518 | A | 1/1999 | Geiser |
| 5,908,301 | A | 6/1999 | Lutz |
| 6,135,950 | A | 10/2000 | Adams |
| 6,473,368 | B1 | 10/2002 | Stanfield |
| 6,508,762 | B2 | 1/2003 | Karnieli |
| 6,735,477 | B2 | 5/2004 | Levine |
| 8,310,368 | B2 | 11/2012 | Hoover et al. |
| 2002/0109600 | A1 | 8/2002 | Mault et al. |
| 2002/0126014 | A1 | 9/2002 | Nishitani et al. |
| 2002/0167863 | A1 | 11/2002 | Davis et al. |
| 2004/0176666 | A1 | 9/2004 | Chait |
| 2005/0245793 | A1 | 11/2005 | Hilton et al. |
| 2006/0064037 | A1 | 3/2006 | Shalon et al. |
| 2006/0197670 | A1 | 9/2006 | Breibart |
| 2007/0030587 | A1* | 2/2007 | Noda ............... G01P 15/18 360/75 |
| 2008/0036737 | A1 | 2/2008 | Hernandez-Rebollar |
| 2008/0137486 | A1 | 6/2008 | Czarenk et al. |
| 2009/0163835 | A1* | 6/2009 | Logan ............... A61B 5/1113 600/595 |
| 2010/0194573 | A1* | 8/2010 | Hoover ............... G08B 23/00 340/573.1 |
| 2011/0199205 | A1* | 8/2011 | Kreml ............... A61B 5/1118 340/539.11 |
| 2012/0101874 | A1* | 4/2012 | Ben-Haim ......... A61B 5/0031 705/14.1 |
| 2013/0130213 | A1* | 5/2013 | Burbank ............. A61B 5/1118 434/236 |

OTHER PUBLICATIONS

"Smoothing." Unknown Author. WaveMetrics, Dec. 7. 2004. Web. Accessed Oct. 12, 2016.*
Amft et al., "Detection of eating and drinking arm gestures using inertial body-worn sensors," *Proceedings of the 2005 Ninth IEEE International Symposium on Wearable Computers*, 4 pages.
Amft et al., "Methods for Detection and Classification of Normal Swallowing from Muscle Activation and Sound," *PHC 2006: Proceedings of the First International Conference on Pervasive Computing Technologies for Healthcare*, 10 pages.
Article—Bushnell, "The Don't-Diet Way to Lose Weight" *SELF*, Apr. 1987, pp. 150-153.
Article—Mahoney, "The Obese Eating Style: Bites, Beliefs and Behavior Modification", *Addicitive Behaviors*, vol. 1, pp. 47-53 (1975).
Ballerini et al., "Testing MRI and Image Analysis Techniques for Fat Quantification in Meat Science," *2000 IEEE Nuclear Science Symposium*, vol. 3, pp. 18-136-18-140—Conference Record (Cat. No. 00CH37149).
Blaskó et al., "Exploring Interaction with a Simulated Wrist-Worn Projection Display," *Proceedings of the 2005 Ninth IEEE International Symposium on Wearable Computers*, 8 pages.
Chambers et al., "Hierarchical Recognition of Intentional Human Gestures for Sports Video Annotation," *Pattern Recognition 2002: Proceedings. 16th International Conference*, vol. 2, 2002, pp. 1082-1085.
Ching et al., *Fitness Monitor System*, IEEE TENCON 2003, Conference on Convergent Technologies for the Asia-Pacific Region, Poster Papers, vol. 4, pp. 1399-1403.
Cleater, J. et al—"*Night Eating syndrome: implications for severe obesity*"—Nutrition and Diabetes (2012) 2, e44; doi:10.1038/nutd.2012.16; (10 pages).
Dong, Y—"*Tracking Wrist Motion to Detect and Measure the Eating Intake of Free-Living Humans*"—PhD dissertation, Electrical & Computer Engineering Dept., Clemson University, 2012; (106 pages).
Dong, Y. et al.—"*A new method for measuring meal intake in humans via automated wrist motion tracking.*"—Appl Psychophysiol Biofeedback. Sep. 2012;37(3):205-15. doi: 10.1007/s10484-012-9194-1. Epub Apr. 10, 2012; (1 page).
Dong, Yujie et al.—"*Detecing Eating Using a Wrist Mounted Device During Normal Daily Activities*"—Dept. of Electrical and Computer Engineering / Dept. of Psychology; Clemson, South Carolina; (date unknown); (7 pages).
Dong, Yujie et al.—"*Detecting Periods of Eating During Free-Living by Tracking Wrist Motion*"—IEEE Journal of Biomedical and Health Informatics; 2013; (8 pages).
Flegal, K. et al.—"*Prevalence of obesity and trends in the distribution of body mass index amoung US adults, 1999-2010*", in Journal of the American Medical Association, vol. 307 No. 5, 2012, pp. 491-497; (2 pages).
Fontana, Juan M. et al.—"*Automatic Ingestion Monitor: A Novel Wearable Device for Monitoring of Ingestive Behavior*"—IEEE Transactions on Biomedical Engineering, vol. 61,No. 6, Jun. 2014 (8 pages).
Gagnadre et al., "Fibre optic sensor for physiological parameters," *Electronics Letters*, vol. 34, No. 21, Oct. 15, 1998, pp. 1991-1993.
Guthausen et al., "Measurement of Fat Content of Food with Single-Sided NMR," *JAOCS*, vol. 81, No. 8, Aug. 2004, pp. 727-731.
Harb, A. et al.—"*Night eating patterns and chronotypes: A correlation with binge eating behaviors*", in Psychiatry Research vol. 200 No. 2, 2012, pp. 489-493; (1 page).
Harland et al., "High resolution ambulatory electrocardiographic monitoring using wrist-mounted electric potential sensors," *Institute of Physics Publishing, Measurement Science and Technology*, vol. 14, No. 7, Jul. 2003, pp. 923-928.
Heil et al., "Characterizing free-living light exposure using a wrist-worn light monitor," *Applied Ergonomics*, vol. 33, No. 4, 2002, pp. 357-363.
Howard et al., "Lightglove Wrist-Worn Virtual Typing and Pointing," *Proceedings of the 5th IEEE International Symposium on Wearable Computers*, 2001, pp. 172-173.
Junker et al., "Gesture spotting with body-worn inertial sensors to detect user activities," *Pattern Recognition 41*, 2008, pp. 2010-2024.
Kandaswamy et al., "Chemometric Modeling of Fat, Cholesterol and Caloric Content of Fresh and Cooked Ground Beef with NIR Reflectance Spectroscopy," *The Instrumentation, Systems and Automation Society*, Sicon/05—Sensors for Industry Conference, Feb. 8-10, 2005, pp. 52-58.
Lementec et al., "Recognition of Arm Gestures Using Multiple Orientation Sensors: Gesture Classification," *2004 IEEE Intelligent Transportation Systems Conference*, Washington, D.C., Oct. 3-6, 2004, pp. 965-970.
Limdi et al, "Design of a Microcontroller-based Device for Deglutition Detection and Biofeedback," *IEEE Engineering in Medicine & Biology Society 11th Annual International Conference*, 1989, pp. 1393-1394.
Maurer et al., "eWatch: A Wearable Sensor and Notification Platform," *Proceedings of the International Workshop on Wearable and Implantable Body Sensor Networks*, 2006, 4 pages.
Orgris et al., "Using Ultrasonic Hand Tracking to Augment Motion Analysis Based Recognition of Manipulative Gestures," *Proceedings of the Ninth IEEE Symposium on Wearable Computers*, 2005, pp. 152-159.

(56) References Cited

OTHER PUBLICATIONS

Ouchi et al., "LifeMinder: A Wearable Healthcare Support System Using User's Context," *Proceedings of the 22nd International Conference on Distributed Computing Systems Workshops*, 2002, 2 pages.

Ouchi et al., "LifeMinder: A Wearable Healthcare Support System with Timely Instruction Based on the User's Context," *IEICE Transactions on Information and Systems*, vol. E87-D, No. 6, 2004 IEEE, pp. 445-450.

Pabler, S. et al.—"*Food intake monitoring: an acoustical approach to automated food intake activity detection and classifications of consumed food*", in Physiological Measurement, vol. 33 No. 6, 2012, pp. 1073-1093; (1 page).

Product Information on LIS3L02AL—MEMS Inertial Sensor: 3-axis-+/−2g ultracompact linear accelerometer from ST, May 2006, 10 pages.

Product Manual for use with InertiaCube3 and the InertiaCube3 Processor from Intersense, 2005, 13 pages.

Saeki et al., "Proposal of Food Intake Measuring System in Medical Use and Its Discussion of Practical Capability," *Knowledge-Based Intelligent Information and Engineering Systems*, 9th International Conference, KES 2005, Proceedings, Part III (Lecture Notes in Artificial Intelligence, vol. 3683, pp. 1266-1273.

Sazonov, E. et al—"*A Sensor System for Automatic Detection of Food Intake Through Non-Invasive Monitoring of Chewing*", in IEEE Sensors Journal, vol. 12 No. 5, 2012, pp. 1340-1348; (2 pages).

Schmidt et al., "Learning an Orchestra Conductor's Technique Using a Wearable Sensor Platform," *Proceedings of the 2007 11th IEEE International Symposium on Wearable Computers*, 2007, 2 pages.

Search Report and Written Opinion for PCT/US2010/020873 dated Mar. 22, 2010, 9 pages.

Sharples et al. "A technical review of mobile computational devices," *Journal of Computer Assisted Learning*, vol. 19, No. 3, Sep. 2003, pp. 392-395.

Sisco, J.—"*Sources of Variance in Bite Count*", PhD dissertation, Psychology Department, Clemson University, May 2012; (277 pages).

Smailagic et al., "eWatch: Context Sensitive System Design Case Study," *Proceedings of the IEEE Computer Society Annual Symposium on VLSI*, 2005 IEEE, 6 pages.

Sugimoto et al., "Development of a wrist-worn calorie monitoring system using bluetooth," *Microsyst Technol.*, vol. 11, No. 8-10, Aug. 2005, pp. 1028-1033.

Takeda et al., "Dish Extraction Method with Neural Network for Food Intake Measuring System on Medical Use," *CIMSA 2003—International Symposium on Computational Intelligence for Measurement Systems and Applications*, Jul. 29-31, 2003, pp. 56-59.

Villanueva et al., "Spatial Resolution of a Noninvasive Measurement of the Arterial and Venous Input Function Using a Wrist Monitor," *2003 IEEE Nuclear Science Symposium Conference Record—Nuclear Science Symposium, Medical Imaging Conference*, V. 4, 2003, pp. 2232-2236.

Wong et al., "Portable Accelerometer Device for Measuring Human Energy Expenditure," *IEEE Transactions on Biomedical Engineering*, vol. BME-28, No. 6, Jun. 1981, pp. 467-471.

World Health Organization Media Center, "Obesity and Overweight", http://www.who.int.mediacentre/factsheets/fs311/en/index.html, retrieved Jan. 29, 2013; (5 pages).

Yao et al., "A Video Processing Approach to the Study of Obesity," *2007 IEEE International Conference*, Jul. 2-5, 2007, pp. 1727-1730.

Zhang, et al., "Detection of Activities by Wireless Sensors for Daily Life Surveillance: Eating and Drinking", *Sensors*, 2009, 9, pp. 1499-1517.

Zhu et al., "Technology-Assisted Dietary Assessment," *Proc. of SPIE-IS&T Electronic Imaging*, SPIE vol. 6814, 2008, 681411-1-681411-10.

\* cited by examiner

DEVICE AND METHOD FOR DETECTING EATING ACTIVITIES

CROSS REFERENCE TO RELATED APPLICATION

The present application claims filing benefit of U.S. Provisional Patent Application No. 61/839,105 having a filing date of Jun. 25, 2013, which is incorporated by reference in its entirety.

BACKGROUND

Obesity is becoming an increasingly important health problem. In 2007-2008, a National Health and Nutrition Examination Survey showed that 68.3% of Americans were overweight and 33.9% of Americans were obese. The World Health Organization reported in 2008 that 1.5 billion adults (age 20+) were overweight and 500 million adults were obese. Obesity is strongly associated with several major health risk factors, such as diabetes, heart disease, high blood pressure, stroke and higher rates of certain cancers. In the United States, the annual medical expense of obesity has been estimated to be $147 billion in 2008 compared to $78.5 billion in 1998.

Obviously, there is a need to provide individuals with additional and improved methods and devices to monitor consumption of foods and beverages in order to help obtain and maintain a healthy weight. Many methods and devices have been developed over the years to monitor consumption. The three most widely used methods are the eating diary, food frequency questionnaire, and 24-hour dietary recall. However, studies have shown that people tend to underreport their consumption when using these methods, typically by 10-40% per day. In addition, these three methods require a sustained conscious effort on the part of the users to continuously self-monitor. Thus, devices and methods for automatically detecting eating activities during natural daily living are desired.

Current research in the dietetics field focuses on two general approaches. The first approach uses a camera. According to this approach, pictures of foods are taken before and after eating, and the amount consumed is estimated by a trained observer who compares the pictures to a database of portion-varying images of the same foods.

The second approach uses wearable sensors. The technology of wearable sensors in general has significantly advanced the assessment of energy expenditure. Example devices include pedometers and more sophisticated accelerometer-based sleep and physical activity monitors. However, the development of a similar tool for monitoring energy intake has proven elusive. Previous research has been limited to testing in the laboratory using cumbersome measurements of sound and muscle activity at the throat and ear, and multiple sensors tracking torso and limb movements. For example, currently, sensors are worn on various parts of the body to track limb motion and measure sound and muscle activity (for example at the throat), in order to determine when the subject is eating. According to one approach, ear and neck mounted sensors are utilized to detect chewing sounds and swallowing motions. Another approach uses a set of sensors including microphones on the laryngopharynx and mastoid bone portions of the throat, an ambient outward-directed microphone, a microphone in the ear, and a strain sensor on the throat.

However, the above disclosed devices and methods have a variety of disadvantages. For example, studies show that when camera based approaches are utilized, the subjects forget to take pictures. Further, these approaches require a large manual effort by both subjects and the trained observers. Further, presently known wearable sensor approaches, which require sensors worn on the throat and ear or full arms and torso, limit the user's freedom of motion and activities, and due to the exposure of the sensors may have limited social acceptance.

Accordingly, improved devices and methods for detecting the occurrence of eating activities are desired in the art. For example, devices and methods that automatically detect eating activity occurrences that allow full freedom of motion and activities and that provide increased social acceptance would be advantageous.

SUMMARY

According to one embodiment, a device for detecting an eating activity occurrence is disclosed. The device includes a sensor for monitoring movement of a portion of a lower arm of a subject, and a processor in communication with the sensor for collecting raw data associated with movement of the portion of the lower arm. The processor is configured to process the raw data and form processed data. The processed data includes a determination that an eating activity has occurred.

In some embodiments, the portion of the lower arm of a subject may be the wrist. Movement of the portion of the lower arm of a subject may include any one or more of movement along or about an x-axis, y-axis, or z-axis, including both rotational and linear movement. Movement may include, for example, any one or more of movement along an x-axis, movement along a y-axis, movement along a z-axis, movement about an x-axis, movement about a y-axis, or movement about a z-axis. Accelerometers and gyroscopes are examples of suitable sensors according to the present disclosure.

In some embodiments, the processor of a device may further collect raw data associated with times at which movement of a portion of a lower arm occurs. Further, a device according to the present disclosure may in some embodiments include memory for storing the raw and/processed data.

According to another embodiment, a method for detecting an eating activity occurrence is disclosed. The method includes sensing movement of a portion of a lower arm of a subject, and processing raw data associated with the movement of the portion of the lower arm of the subject to form processed data. The processed data includes a determination that an eating activity has occurred.

In some embodiments, the method may further include collecting raw data associated with times at which movement of the portion of the lower arm occurs.

BRIEF DESCRIPTION OF THE FIGURES

A full and enabling disclosure of the present subject matter, including the best mode thereof, to one of ordinary skill in the art, is set forth more particularly in the remainder of the specification, including reference to the accompanying figures, in which.

Figure 1:
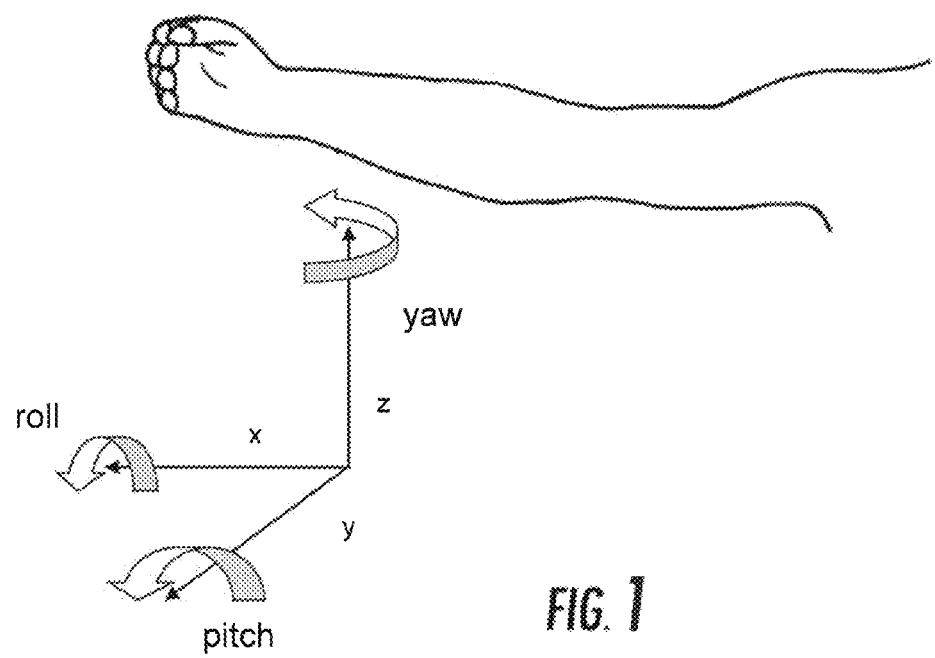
FIG. 1 is a schematic illustrating the terms pitch, yaw, and roll with reference to a human arm and as utilized herein.

Repeat use of reference characters in the present specification and drawings is intended to represent the same or analogous features or elements of the presently disclosed subject matter.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made to the disclosed subject matter without departing from the scope or spirit of the disclosure. For instance, features illustrated or described as part of one embodiment may be used with another embodiment to yield a still further embodiment.

In general, the present disclosure is directed to devices and methods for detecting eating activity occurrences. As utilized herein, the term "eating activity" generally refers to a period of time of generally continuous consumption. For example, an eating activity may be a breakfast, lunch, brunch, dinner or snack, and may further refer to an eating activity within one or more of these eating activities, such as consumption of a single course of a meal such as an appetizer, main course, or dessert. An eating activity is differentiated herein from a single bite or a single drink that may take place within the larger macro concept of an eating activity. Thus, the recognition of an eating activity as described herein would not encompass a single bite of food taken, for instance as a sample tasting, or a single drink of liquid, as at a water fountain.

A device according to the present disclosure includes one or more sensors and a controller. The sensors, which in exemplary embodiments include accelerometers and/or gyroscopes, monitor movement of at least a portion of an arm of a user, such as a wrist. The sensors are coupled to a controller which processes raw data associated with the movement to form processed data. The processed data includes a determination that an eating activity has occurred.

In exemplary embodiments, a device according to the present disclosure may be developed as a small electronic device that may be configured to be worn by a subject to monitor motion of the lower arm including hand, forearm, and/or wrist motion of the subject. Measurements obtained may be stored in memory for later retrieval. For example, a device in accordance with the present disclosure may correspond to a wristband mounted device physically resembling a watch although other wear options are envisioned such as a patch that may be adhered to a portion of the wrist, forearm, or hand.

One positive aspect of a device in accordance with the present disclosure is that a subject may comfortably wear the device for extended periods. The ability to comfortably wear the device for extended periods can provide not only ease of use but additional motivation to continue use of the device to provide the long term feedback and data necessary to effectively monitor an extended program as may be preferred to ensure long-term change of eating habits.

Figure 2:
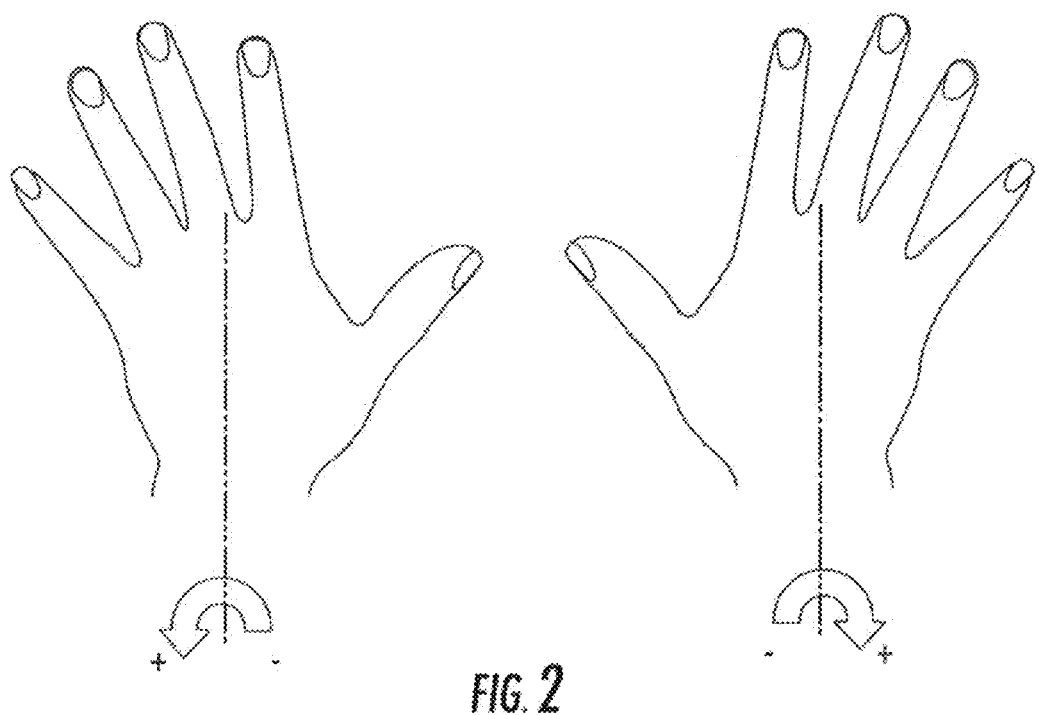
FIG. 2 is a schematic illustrating negative and positive roll as the terms are utilized herein.

Referring now to the drawings, FIG. 1 and FIG. 2 illustrate the directional terms utilized throughout this disclosure. As can be seen in FIG. 1, and with reference to a human arm, the terms roll, pitch, and yaw as utilized herein correspond to rotational movement about the x-, y-, and z-axis, respectively, with the x-axis corresponding to the axial length of the arm, as illustrated. Movements may additionally be made linearly along the x-, y-, and/or z-axis. With regard to the roll of an arm, hand, or wrist, FIG. 2 illustrates a right and left hand, positive roll being defined as illustrated by the direction of the arrows and the + signs in FIG. 2 as the direction of supination, i.e., a clockwise roll for the right hand and a counterclockwise roll for the left hand. Negative roll as utilized herein generally refers to the direction of pronation, i.e., a counterclockwise roll for the right hand and a clockwise roll for the left hand, as illustrated in FIG. 2 by the − sign.

Devices and methods disclosed herein are based upon the realization that during the course of normal activity, one or more portions of the lower arm, and in exemplary embodiments the wrist, undergoes a series of characteristic energy expenditures due to movement that indicate the occurrence of an eating activity. For example, at the beginning of an eating activity, there tends to be a period of higher wrist or forearm motion activity, caused by things like bringing food to a table, adjusting the position of utensils, opening food containers, and unwrapping food. During eating, the total wrist and/or forearm motion activity is reduced. At the end of an eating activity, there tends to be another period of higher wrist or forearm motion activity, likely caused by things like putting remaining food away, washing hands, standing up, and putting dishes away.

In addition, it has been discovered that during an eating activity, i.e., during the lower total motion energy period (also referred to herein as a segmented period) that is between two high activity periods, there are also recognizable motion features that are carried out. For instance, features related to forearm/wrist/hand motion direction, rotation, speed and/or acceleration can be related to, e.g., cutting a bite, placing a bite on a utensil, eating a bite, etc. that take place. According to one embodiment of the present disclosure, one or more of these motion features can be recognized and analyzed to confirm that the low activity period is an eating activity. Presently disclosed devices and methods utilize such characteristic movements that can include both the motion energy and motion activity over time and the recognition and evaluation of features during a period of recognized motion energy level to determine whether an eating activity has occurred.

Detection of an eating activity can include detection of an activity pattern that includes high activity periods sandwiching a low activity period (termed herein as segmentation) in conjunction with detection of one or more motion features during the low activity period (termed herein as classification). In addition, a detection regime can include processing of raw data that is obtained from the sensor(s) to smooth the raw data and remove noise, downsample, or otherwise prepare the raw data for the detection regimens (termed herein as pre-processing). Thus, in one embodiment, a processor of a device can manipulate raw data obtained from one or more sensors through pre-processing, segmentation, and classification to determine that the subject has experienced an eating event.

Figure 3:
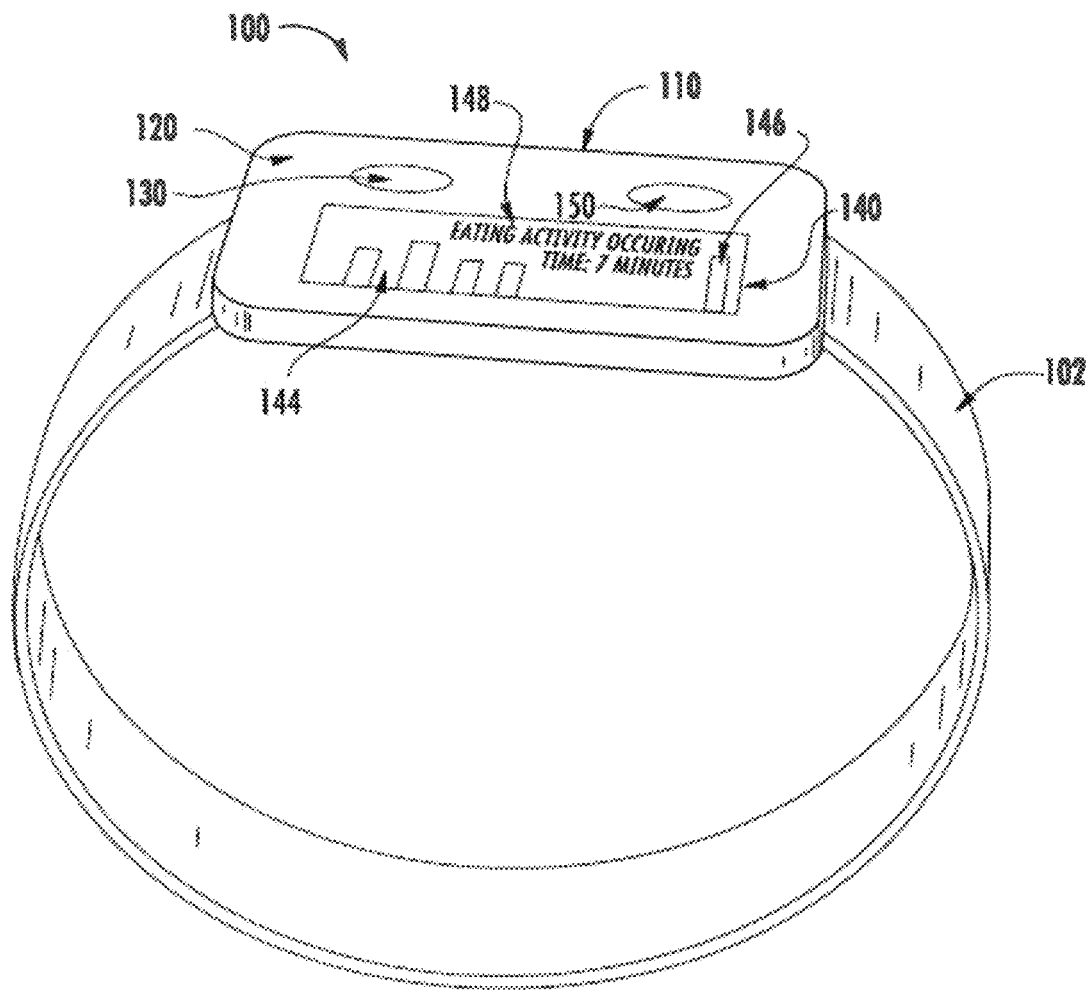
FIG. 3 is perspective view of a device according to one embodiment of the present disclosure.

FIG. 3 illustrates one embodiment of a device 100 according to the present disclosure. As shown, a device 100 may be configured as a small electronic device that may be attached to the forearm, wrist or hand of an individual user. In an exemplary embodiment, device 100 may be attached to and include an adjustable wristband 102. However, such user attachment method is not a specific limitation of the present technology, it only being required that the device 100 be associated with the user in a manner permitting detection of hand and/or wrist motion.

In exemplary embodiments of the present technology, a device 100 may be attached to the forearm, wrist or hand of an individual user by way of any expandable bracelet or cuff or any other suitable means. For instance, wristband 102 can be attached to a user's wrist according to any device or method including, without limitation, a hook and eye closure (e.g., Velcro®) or a buckle. In addition, wristband 102 may include one or more materials in any suitable combination including metal, plastic, woven and/or nonwoven textiles, and the like. It should be noted that any method for attaching a device 100 to the wrist, forearm, or hand of a user is encompassed by the present disclosure. For instance, device 100 may include clips, loops, or so forth so as to be attachable to a user's clothing or body. In one embodiment, device 100 may include an adhesive surface, and may be adhered directly to a user's skin.

A device 100 may be paired with other objects that can be worn on the wrist or arm. For instance, a device 100 can be combined on a wrist band with a watch or decorative items or designs such that the device 100 is not overly apparent to other persons who are in the vicinity of the user.

With further reference to FIG. 3, it will be seen that device 100 is provided with a housing 110 enclosing a number of components. As illustrated in FIG. 3, device 100 is provided with a front panel 120 on which can be control and display elements to provide a user with operational control of the device 100 as well as feedback of data and other information as may be useful to the user. Principal components mounted on the front panel 120 to the device 100 include an on/off switch 130, a display panel 140 and a visual indicator 150, each of which will be more fully described herein.

With further reference to FIG. 3, display panel 140 is configured to provide visual indications of properties monitored by device 100, such as the occurrence and time period of an eating activity. Thus in an exemplary embodiment, display panel 140 may correspond to a liquid crystal display (LCD) and light emitting diode (LED) display combination or other suitable display device and may display information in the form of text or graphical information 144, battery charge level 146, and eating occurrence information 148. These displays may optionally be provided as color displays where variations in color may be associated with different visual cues for the user.

Device 100 can incorporate an on/off switch 130 that allows a user to turn the device on or off and a visual indicator 150 that can allow a user to see that the device is working properly.

Figure 4:
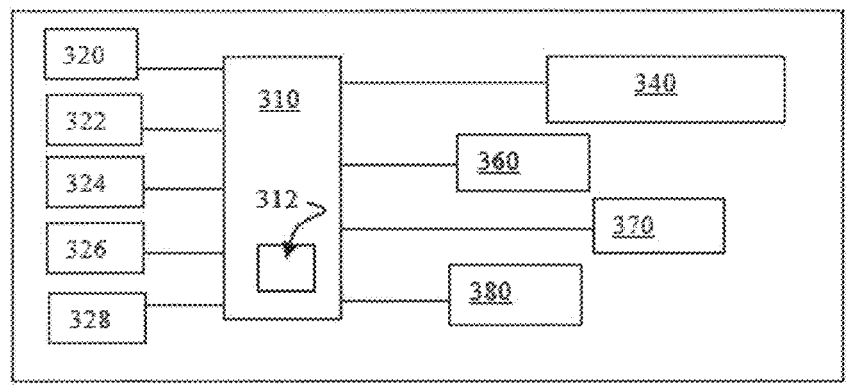
FIG. 4 is a schematic illustrating operational circuitry of a device according to one embodiment of the present disclosure.

With reference now to FIG. 4, there is illustrated an exemplary configuration of operational components of an exemplary device 100 in accordance with the present technology. The electronic circuit required to provide operational enablement of a device 100 may, in an exemplary embodiment, correspond to a processor 310, associated sensors 320, 322, 324, 326, 328, display device 340 and other elements as will be described later.

A processor 310 can be a microcontroller, microprocessor, system on chip (SOC), or any processor capable of being in communication with a device 100. It should be understood that the processor 310 may be incorporated in a device 100, or may be remote from the device 100 and in communication therewith through a suitable wired or wireless connection as discussed below. A processor 310 can incorporate therein an internal clock capable of measuring time, and can thus collect raw data associated with times at which movements of a portion of an arm, such as a wrist, occur. In general, a processor 310 can collect raw data from sensors 320, 322, 324, 326, 328 and can carry out desired data manipulation according to input instruction, such as according to algorithms as discussed below with regard to pre-processing, segmentation, and classification. In one embodiment, processor 310 can store information about detected movement of a portion of the arm, such as the wrist, in a memory 312, and retrieve this information for further computations at a later time. Memory can be integral to the processor (for example in the case of an SOC) or separable there from (for example a memory chip). Moreover, a device 100 can utilize multiple different memory devices and methods, as are known in the art.

Processor 310 can interact with a user interface that performs device-level operations. These operations could include, for example, turning the device on and/or off, resetting internally stored data, downloading internally stored data to an external computer, setting the time and date, and setting various other parameters of the methods used to detect eating activities. Options can control how the feedback is provided to the user. Other operations can customize the operation of the device based upon the user's preferences. For example, the device can be made to operate only in certain time-of-day windows, or to provide certain types of feedback.

Processor 310 may correspond to a microcontroller depending on the desired operational capabilities of the device 100. For example, if a relatively simple construction or model of device 100 is desired, for example, one capable of limited operation, a microcontroller may be used. A more functionally advanced model of device 100 may require more sophisticated onboard processing capability and, thus, may require the use of a microprocessor.

With further reference to FIG. 4, operational circuitry of device 100 may include a number of sensors 320, 322, 324, 326, 328 configured to be responsive to movement along or about the x-axis, y-axis, and/or z-axis to obtain raw data. In some embodiments, for example, a sensor 320, 322, 324, 326, 328 may be components of an accelerometer. The accelerometer may monitor, for example, movement along or about the x-axis, y-axis, and/or z-axis. In other embodiments, for example, sensors 320, 322, 324, 326, 328 may be components of a gyroscope. The gyroscope may monitor, for example, movement along or about the x-axis, y-axis, and/or z-axis. One or more sensors may be utilized according to the present disclosure, and each sensor may monitor movement along or about any one or more axes. In one embodiment, a device may include multiple types of sensors. For instance, a device may include both one or more accelerometers and one or more gyroscopes.

With further reference to FIG. 4, device 100 can include additional features. For instance, device 100 can include a Radio-frequency Identification ("RFID") chip 360 or other non-invasive and contactless user identification system that uniquely identifies the user. Device 100 may also include a contactless smart chip 370 (CSC) or other central processing unit with associated memory and integrated bus that enables the device 100 to perform bi-directional data communication with properly equipped external devices and systems. Additionally, device 100 may be powered by way of battery 380. Battery 380 may be a rechargeable battery and may be recharged by way of a separate battery charger device (not shown) including a built-in solar cell charging arrangement mounted on device 100.

External devices and systems with which device 100 can communicate can correspond to computer connectivity ports or devices such as a USB (or other data transfer type) computer connection that allow the exchange of user data from a device 100 to an external device. When user data has been exchanged from a device 100, the non-volatile memory 312 may be flushed and data acquisition in the device 100 begun again.

Data from device 100 may be transferred to an external device, e.g., a computer, via any communication link that may correspond to telephone modem, direct, wireless, and Internet connection or other communications methodologies as may be available or made available. Transmission of a signal to a remote site may be carried out with a radio frequency transmission scheme or with any other wireless-type transmission scheme, as is generally known in the art. For instance, a wireless telephone or internet communications scheme can be utilized to transmit a signal to a remote location according to known methods.

An external device may be accessible to only the user of device 100 or may be a shared device. For instance, an external device may be a private computer, within the wearer's home, office, or so forth, or may be at a monitoring facility, for instance at a medical facility, such that appropriate medical personal may informed of the user's eating habits. Upon receipt of data from device 100 at the external device, the data may be converted to sequential user records and stored in a relational database format (RDBMS) where at least a User ID, Mode, and Date/Time of Measurement may be used as primary keys along with the User's unique ID (e.g., as maintained in the RFID chip 360).

In alternative embodiments, data obtained by device 100 may be transmitted to multiple receivers, so as to inform both the user and others (e.g., medical personnel) of the user's eating habits.

A device as described herein can include additional sensors as well, in order to detect additional information about a user in addition to the occurrence of eating activities. For instance, a device can include a sensor array on a surface of a device that may correspond to a number of individual sensors that provide, in cooperation with additional control circuitry, for the automatic and periodic measurements of physiological and biometric properties including, without limitation, heart pulse rate, blood pressure (systolic and diastolic), and other such physiological and biometric measurements as may be deemed important. For example, an additional sensor may be provided on a device that may correspond to an infrared sensitive diode that may be used to detect blood flow from which may be calculated both heart pulse rate and blood pressure.

According to another embodiment, a device as disclosed herein may incorporate a temperature sensor for detection the body temperature of a user, a moisture sensitive sensor that may provide information relative to body moisture loss, and so forth. Alternative choices of sensors as well as additional (or fewer) sensors may be selected as desired or necessary to provide data input to the device 100 as necessary for its particular design.

As discussed above, one or more sensors 320, 322, 324, 326, 328 may monitor movement of a portion of a lower arm of a subject, such as in exemplary embodiments a wrist or, alternatively, a hand or other suitable portion of a lower arm. A processor 310 may be in communication with the sensors for collecting raw data associated with such movement. The processor 310 may process the raw data, as well as raw data associated with times at which such movements occurred, and form processed data, which may include a determination of whether an eating activity has occurred through steps including pre-processing of the raw data followed by segmentation and classification of the pre-processed data.

As discussed above, segmentation includes recognition of a first pattern by use of the device that determines that a low total activity period has taken place between two higher activity periods. This low activity period can thus be determined to be a potential eating activity. Following recognition of this potential eating activity (segmentation), features of the low activity period can be evaluated via classification to confirm that and eating activity has taken place. Various equations and algorithms have been developed and utilized according to the present disclosure to process the raw data via pre-processing, segmentation and classification as described further below.

Pre-Processing

An algorithm for processing the raw data may include pre-processing portions. A pre-processing portion may be utilized to smooth raw data, as desired or required.

In some embodiments, for example, pre-processing may be utilized to smooth raw data associated with movement of a portion of an arm of a subject at a time t ($S_t$). Smoothing may be performed utilizing the following equation:

$$S_t = \sum_{i=-N}^{0} R_{t+i} \frac{e^{\frac{-t^2}{2R^2}}}{\sum_{x=0}^{N} e^{\frac{-(x-N)^2}{2R^2}}}$$

wherein $R_t$ is the raw data at time t $S_t$ is the smoothed data at time t

N is a window size designating the number of data points over the sample period

R is the standard deviation of the Gaussian distribution of the raw data

Smoothing may be done using a Gaussian-weighted window of the raw data as is generally known in the art. The midpoint of the window (i=0) corresponding to the peak of the Gaussian is centered on the current measurement ($R_0$), so that only half of a Gaussian distribution is used for smoothing. The most recent N measurements are buffered and updated after each new measurement, shifting out the previously stored oldest measurement. The value R denotes the width of the Gaussian distribution relative to the buffer size used to smooth the data. For example, for data sampled at 60 Hz, in some embodiments a buffer size of 1 second (N=60) with a Gaussian distribution defined by R=40 has been discovered to produce good results for the sensors. A pre-processing regime is not limited to these parameters, however. For instance, data can be sampled at a lower rate in some embodiments, which can decrease energy and storage requirements of the device. By way of example, raw data can be sampled at about 100 Hz or less or about 50 Hz or less in some embodiments. For instance raw data can be obtained at a rate of from about 5 Hz to about 60 Hz or from about 10 Hz to about 40 Hz in some embodiments.

Following pre-processing, an algorithm can include a detection portion that can in turn include a segmentation portion and a classification portion.

Segmentation

A detection portion of an algorithm according to the present disclosure may be utilized to detect patterns of motion activity of a lower arm portion, such as a wrist, as measured by the sensors, that indicates eating activity occurrences. Lower arm portion activity is measured by the sensors, and denoted herein as follows:

$G_{\alpha,t}$ represents yaw movement at time t;
$G_{\beta,t}$ represents pitch movement at time t;
$G_{\gamma,t}$ represents roll movement at time t;
$G_{any,t}$ represents any of yaw movement, pitch movement, or roll movement at time t;
$G_{sum,t}$ represents the sum of any or all of yaw movement, pitch movement, and roll movement at time t;
$A_{x,t}$ represents movement along the x-axis at time t;
$A_{y,t}$ represents movement along the y-axis at time t;
$A_{z,t}$ represents movement along the z-axis at time t;
$A_{any,t}$ represents any of movement along the x-axis, y-axis, or z-axis at time t;
$A_{sum,t}$ represents the sum of any or all of linear movement along the x-axis, y-axis, and z-axis at time t; and
$M_{sum,t}$ represents the sum of any or all of yaw movement, pitch movement, roll movement, movement along the x-axis, movement along the y-axis, and movement along the z-axis at time t.

It should be understood that such denotations are not limited to measurements by respective gyroscopes and accelerometers, and rather that movement measurements using any suitable sensors are within the scope and spirit of the present disclosure.

Figure 5:
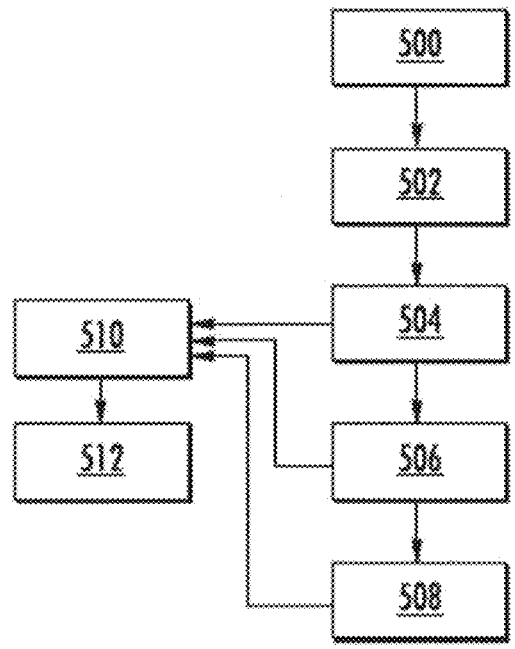
FIG. 5 is a flow chart illustrating an algorithm for detecting an eating activity occurrence according to one embodiment of the present disclosure.
Figure 6:
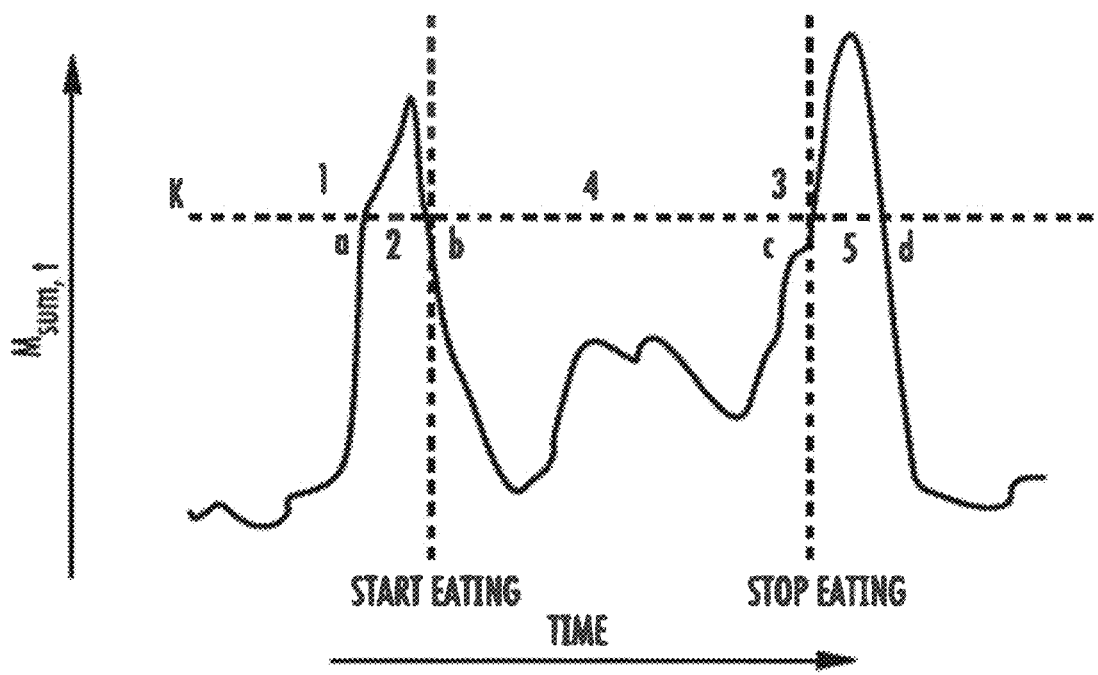
FIG. 6 is a graph indicating the occurrence of an eating activity as detected by the algorithm of FIG. 5.

As shown in FIG. 5 and FIG. 6, a detection portion of an algorithm can include steps that detect patterns of motion activity of a lower arm portion, as measured by the sensors, which indicate eating activity occurrences. For example, the movement activity of a portion of a subject's lower arm, such as the wrist, may increase or spike prior to and subsequent to an eating activity. These spikes may be caused by eating activity preparation, such as cooking and otherwise preparing a meal, and eating activity cleanup, such as washing dishes, etc., as discussed above.

A segmentation algorithm according to the present disclosure may in some embodiments calculate the regularity and mean absolute deviation of a movement of a portion of subject's lower arm. Regularity may indicate a distinctive pattern of movements and pauses, and mean absolute deviation may indicate the increased movement that may occur during an eating activity. Thus, the occurrence of an eating activity may be determined via segmentation of the raw or pre-processed data.

For example, and with reference to FIG. 5, a segmentation portion may include a step 500 (which may be a first step) during which it is determined that the motion activity of the subject's lower arm (e.g., an average sum of data associated with movement of a portion of a subject's lower arm) meets a threshold value at a first time a (graphically illustrated in FIG. 6 with regard to $M_{sum,t}$) and that the motion activity of the subject is increasing as the threshold value K is passed at time a. The motion activity may be determined as the average sum of data, which may be, for example, $M_{sum,t}$, $G_{sum,t}$, or $A_{sum,t}$ at time t=a, and the data may pre-processed (e.g., smoothed) as described above and examined over time to determine that the motion activity is increasing. The threshold value may be denoted as K, and may be calibrated for individual subjects or chosen as discussed further herein.

The segmentation portion of the eating activity detection may further include a step 502 (which may be a second step) during which it is determined that the motion activity of a subject's lower arm again meets the threshold value K at a later time b and that the motion activity is dropping beneath the threshold value as it passes the threshold K. The step 502 may also determine the amount of time that passes between the time b and the time a. This amount of time corresponds to the high activity period that precedes an eating activity. A time limit for this period between time b and time a may be calibrated for individual subjects or chosen. For example, a limit for this amount of time between time b and time a may be approximately 1 minute or greater and approximately 5 minutes or less, approximately 10 minutes or less, or approximately 15 minutes or less.

The segmentation portion may further include the step 504 (which may be a third step) during which it is determined that motion activity of a subject's lower arm has again attained the threshold value K at a later time c and that the motion activity again increases as it passes the threshold value K. The average sum of data may be, for example, $M_{sum,t}$, $G_{sum,t}$, or $A_{sum,t}$ at time t=c.

The segmentation portion may further include the step 506 (which may be a fourth step) during which it is determined that the motion activity of a subject's lower arm has again met the threshold value K at a later time d as the motion activity of the subject drops beneath the threshold value K. The step 506 may also determine the amount of time that passes between the time c and the time a, which correlates to the time spent preparing the food and the time spent consuming the food (i.e., the eating event). A time limit for the difference may be calibrated for individual subjects or chosen. For example, a time limit may be approximately 1 minute or more, approximately 2 minutes or more, approximately 3 minutes or more, approximately 4 minutes or more, or approximately 5 minutes or more. The time limit may further be approximately 20 minutes or less, approximately 25 minutes or less, approximately 30 minutes or less, or approximately 35 minutes or less.

The segmentation portion may further include the step 508 (which may be a fifth step) of determining the difference between the fourth time d and the third time c, which correlates to the time spent subsequent to the eating event (e.g., the clean-up period). A time limit for the difference may be calibrated for individual subjects or chosen. For example, a time limit may be approximately 1 minute or more, approximately 5 minutes or less, approximately 10 minutes or less, or approximately 15 minutes or less.

Each point a, b, c, d may be a time wherein the motion activity (e.g., the average sum of data) equals the threshold value K, with the data processing further determining whether the motion activity is increasing or decreasing at the time that the average sum of data equals K. These segmentation steps may provide a determination of whether an eating activity preparation event has occurred, whether an eating activity cleanup event has occurred, and whether an eating activity has occurred between the eating activity preparation event and the eating activity cleanup event. Thus, if the parameters of each step are met, it may be determined that an eating activity has occurred.

In some embodiments, additional steps may be utilized to detect the occurrence of an eating activity via segmentation.

For example, if the first and second above disclosed steps are met, but the third, fourth, and fifth steps are not completely met, additional steps may be evaluated to determine the occurrence of an eating activity. In these embodiments, the segmentation portion may thus include the step 510 (which may be a sixth step) of determining the difference between the third time c and the second time b, which correlates to the time spent at the eating event. A time limit for the difference may be calibrated for individual subjects or chosen. For example, a time limit may be approximately 1 minute or more, approximately 2 minutes or more, approximately 3 minutes or more, approximately 4 minutes or more, or approximately 5 minutes or more. The time limit may further be approximately 20 minutes or less, approximately 25 minutes or less, approximately 30 minutes or less, or approximately 35 minutes or less.

The segmentation portion may further include the step 512 (which may be a seventh step) of determining whether the motion activity associated with the movement at the third time c exceeds a running average of the data by a predetermined multiplier. The predetermined multiplier may be calibrated for individual subjects or chosen. For example, the predetermined multiplier may be 2.0, 2.1, 2.2, 2.3, 2.4, 2.5, 2.6, 2.7, 2.8, 2.9, 3.0, or any other suitable multiplier. These steps may provide additional support for determination that an eating activity preparation event has occurred, whether an eating activity cleanup event has occurred, and whether an eating activity has occurred between the eating activity preparation event and the eating activity cleanup event.

The threshold value K may be any suitable value determined to yield accurate detection of eating activity occurrences, and may vary based on the type of sensor(s) utilized. For example, in embodiments wherein a sensor is an accelerometer, the threshold value K (e.g., $A_{sum,t}$) may be in the range between approximately 0.1 meters per second squared ("m/s$^2$") and approximately 1.5 m/s$^2$, such as between approximately 0.5 m/s$^2$ and approximately 1.0 m/s$^2$, such as approximately 0.7 m/s$^2$, approximately 0.8 m/s$^2$, approximately 0.9 m/s$^2$, or approximately 1.0 m/s$^2$. In embodiments wherein a sensor is a gyroscope, the threshold value K (e.g., $G_{sum,t}$) may be in the range between approximately 10 degrees per second ("deg/s") and approximately 100 deg/s, such as between approximately 20 deg/s and approximately 90 deg/s, such as between approximately 30 deg/s and approximately 80 deg/s, such as between approximately 40 deg/s and approximately 70 deg/s, such as between approximately 40 deg/s and approximately 60 deg/s, such as approximately 45 deg/s, approximately 50 deg/s, or approximately 55 deg/s.

When summing the raw or smoothed data, the data can be summed as a vector, as the absolute value of the vector magnitude (e.g., as the square root of the squared value of the vector magnitude), or according to any other suitable summation technique, provided that the summation technique is consistent with the threshold value K assigned to the motion activity segmentation determination.

Any suitable movement of a portion of a subject's lower arm may be monitored according to the present disclosure to determine the motion energy and the motion activity. In exemplary embodiments, the wrist is monitored. Further, the present inventors have discovered that the roll of the wrist about the x-axis is particularly indicative of the occurrence of an eating activity. Thus, in some exemplary embodiments, the regularity and mean absolute deviation of wrist roll are monitored and calculated for segmentation of motion activity. It should be understood, however, that the present disclosure is not limited to monitoring wrist roll. For example, the hand or other suitable portion of a lower arm of a subject may be monitored. Further, any other suitable movement of a portion of a lower arm as discussed above may be monitored.

Further, it should be understood that other suitable algorithms may be utilized in segmentation according to the present disclosure. For example, in some embodiments, hidden Markov models as are known in the art may be utilized to detect segmentation during eating activity occurrences. In some embodiments, for example, hidden Markov models may be utilized to provide contextual information regarding a subject's eating habits. Such contextual information may include, for example, times of day during which the subject typically eats and/or other habitual information about the subject. In other embodiments, such contextual information may be provided through the use of other suitable algorithms as are generally known in the art. The inclusion of this contextual information may assist in improving the accuracy of devices and methods according to the present disclosure in detecting eating activity occurrences.

In another embodiment, the motion energy of a subject at a time t ($E_t$) can be determined by calculation of the motion energy of a subject, and this value can be utilized in a segmentation determination process as described above. The segmented motion energy determination can utilize the smoothed raw data determination obtained during pre-processing for multiple movement types (e.g., linear motion along an axis and/or rotational motion about an axis) over a time period window to obtain a value for the motion energy of a subject at a time t. For instance, the segmented motion energy can be determined by use of an accelerometer and the combination of motion detection in all three of the linear axes x, y, and z according to the following equation:

$$E_t = \frac{1}{W+1} \sum_{i=t-\frac{W}{2}}^{i=t-\frac{W}{2}} |S_{x,i}| + |S_{y,i}| + |S_{z,i}|$$

wherein
  $E_t$ is the total motion energy
  W is the window size
  $S_{x,i}$, $S_{y,i}$, and $S_{z,i}$ are the smoothed acceleration raw data values on the x, y, and z axis at time i.

The window size W can be, for example about 30 seconds or greater, about 1 minute or greater, or about 2 minutes or greater. In some embodiments, the window size can be about 10 minutes or less, about 5 minutes or less, or about 4 minutes or less. For instance, a sliding window of about 1 minute can be used to smooth over brief vigorous motions and indicate the boundaries of an eating activity as determined by a process such as outlined above.

Figure 9:
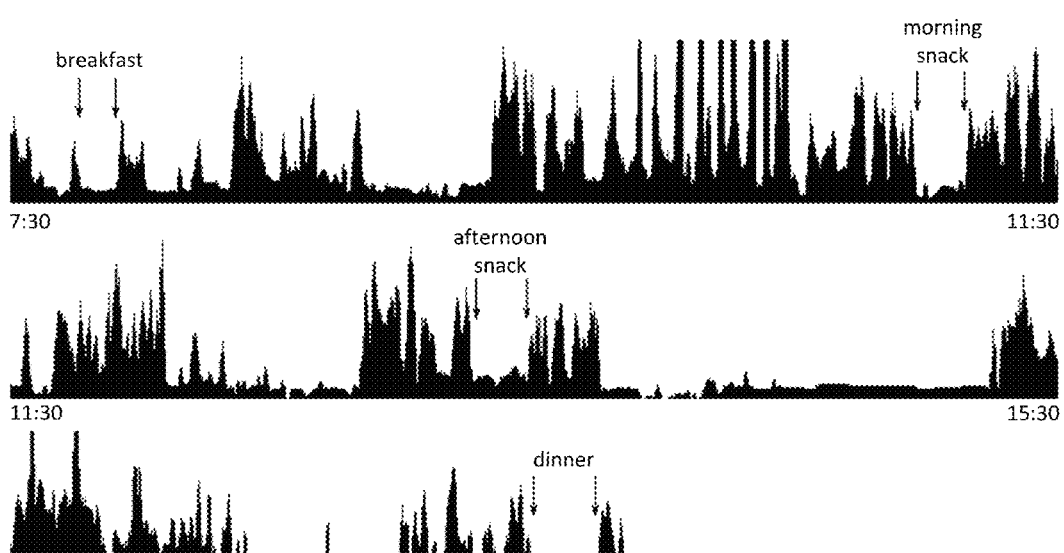
FIG. 9 graphically illustrates the wrist motion activity of an individual over a 12 hour period as obtained by use of an accelerometer.

FIG. 9 illustrates the wrist motion activity of an individual over the course of 12 hours as determined by use of an accelerometer attached to the wrist. Time (t) is the x-axis of FIG. 9 and $E_t$ as described above using a sliding window W of 1 minute is the y-axis of FIG. 9. The start and stop times of meals and snack shown in FIG. 9 were manually logged by the individual. As can be seen, all of the marked eating activities show a pronounced energy peak prior to and subsequent to the eating activity. While the data of FIG. 9 was obtained from an accelerometer, any detector may be utilized that can identify energy peaks at local maxima that are sufficiently pronounced while suppressing marginal local maxima.

To identify the eating activities given such raw data, a segmentation algorithm can be developed. One example of a suitable algorithm is as follows:

```
loop t (data index)
    reset (T1,T2)
    while (E(t) < T2)
        t = t+1
        if (E(t) < T1_
            reset (T1,T2)
    end while
    while (E(t) > T1)
        t = t+1
    end while
end loop
```

Figure 10:
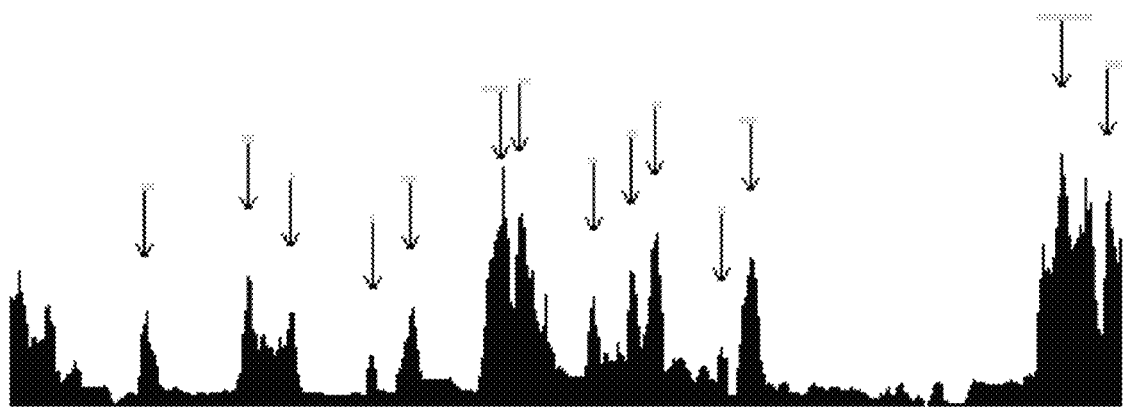
FIG. 10 presents the results of applying one embodiment of a peak activity detection algorithm on raw motion data.

The algorithm loops through the data from beginning to end, with each pass through the two 'while' loops identifying a single period of high activity. The two energy thresholds T1 and T2 can be in one embodiment set equal to the value of the signal (e.g., wrist motion activity) at the current index, and two times that value. The first 'while' loop iterates until the signal exceeds the second (larger) threshold, in this particular embodiment requiring the signal to go twice above its previously observed minimum. During this search, if a signal value is found that is lower than T1, then the required thresholds are recalculated. Once the signal has exceeded the second threshold, the second 'while' loop iterates until the signal falls below the first (lower) threshold. The index of the peak is taken as the location with the maximum signal value found during the two 'while' loops. FIG. 10 presents the result of the peak detector algorithm on the first 2 hours of data from FIG. 9. As the motion energy was calculated over a sliding window of 1 minute, brief periods of intense motion such as a single gesture will not trigger the segmentation algorithm to recognize a peak period of motion.

Classification

As can be seen in FIG. 10, merely looking at periods of high activity surrounding a period of lower activity via segmentation can lead to false positives in recognition of an eating activity. As such, one embodiment of the process can include classification via recognition and examination of one or more features during the low activity eating period that is between the two recognized high activity periods.

Movement during the eating activity, between the two activity spikes in movement, has been found to be particularly distinctive. For example, movement during an eating activity may have a distinctive pattern of movements and pauses, which may indicate movement to for example take a bite of food or a drink of a liquid, and pausing to chew and swallow the bite of food or swallow the drink of liquid. As such, an algorithm according to the present disclosure may in some embodiments include the segmentation steps of determining whether an eating activity preparation event has occurred, determining whether an eating activity cleanup event has occurred, and determining whether an eating activity has occurred between the eating activity preparation event and the eating activity cleanup event followed by classification steps that can confirm that an eating activity has occurred during the activity preparation event and the eating activity cleanup event.

A classification step includes recognition and analysis of one or more movement features that can take place during an eating activity. In general, features can be defined as motion activities that involve rotational and/or linear motion in a regular and recognizable pattern that are often carried out by individuals during motion related to an eating activity such as taking a bite, taking a drink, putting food on a fork or spoon, cutting an individual bite from a larger portion, placing food on a plate or in a bowl, etc. Through recognition of one or more typical features, an eating event can be confirmed as existing between two high activity periods. A value for each selected feature can be calculated over the time period between the high activity periods, e.g., between time b and time c as illustrated on FIG. 6 and then analyzed as described below in order to classify a low motion activity period as either an eating activity period or a non-eating activity period.

One feature as may be utilized during classification is manipulation, which is defined as the ratio of rotational motion to linear motion. Manipulation can be calculated as:

$$f_{1,w} = \frac{1}{W} \sum^{W} \frac{|S_{\phi,t}| + |S_{\theta,t}| + |S_{\psi,t}|}{|S_{x,t}| + |S_{y,t}| + |S_{z,t}|}$$

wherein
$f_{1,w}$ is the manipulation feature
W is the span of the period
t is the time index that iterates across the span
S is the smoothed datum for yaw ($\phi$) pitch ($\theta$), roll ($\phi$) and linear motion in the x, y, and z axis as described above.

Another classification feature as may be analyzed during the low motion activity period is the linear acceleration. This feature may be calculated as:

$$f_{2,w} = \frac{1}{W} \sum^{W} |S_{x,t}| + |S_{y,t}| + |S_{z,t}|$$

wherein $f_{2,w}$ is the linear acceleration feature and the other terms are as defined above.

The amount of wrist roll motion can also be determined as an eating activity defining feature during classification. This feature can be calculated as:

$$f_{3,w} = \frac{1}{W} \sum^{W} \left| S_{\psi,t} - \frac{1}{W} \sum^{W} S_{\psi,t} \right|$$

The regularity of wrist roll motion can also be determined as an eating activity defining feature during classification. This feature can be calculated as:

$$f_{4,w} = \frac{1}{W} \int_{W} 1 \forall t \in [|S_{\psi,t}| > 10° \ldots t+8 \text{ sec}]$$

The regularity of wrist roll motion can takes on a value between 0 and 1, representing the percentage of time that the wrist is in roll motion. The calculation includes the time that the wrist roll is at a threshold rotational speed of at least 10 degrees per second (°/sec), plus a period of 8 seconds after each occurrence of wrist roll motion that falls below a speed of 10°/sec.

The third and fourth features are features that have been utilized in the past to detect individual bites as described in U.S. Pat. No. 8,310,368 to Hoover, et al., which is incorporated herein by reference. The values of 10° per second and 8 seconds are not required and can be varied depending on the specific parameters of an application. In one embodiment, for example, the threshold rotational speed of the wrist roll can be from about 5°/sec to about 15°/sec and the period can be from about 1 second to about 15 seconds, or from about 4 seconds to about 12 seconds in some embodiments.

Other features can be incorporated in the analysis as well, by way of example, and without limitation, features as may be examined may include the cumulative time spent eating for the day or during the eating activity, the time since the last eating activity, the spectral power of manipulation related to bite events, etc.

Following determination of a value for one or more features, the feature values can be analyzed in order to classify the period as either a non-eating activity or an eating activity. One method of classification can utilize the Bayesian approach, which assigns the most probably class $c_i \in C$, given feature values $f_1, f_2, \ldots, f_N$. Using the naïve assumption of independence of features, the classification problem can be written as:

$$c_i = \underset{C}{\mathrm{argmax}} P(c_i) \prod_j P(f_j | c_i)$$

In the present case, there are only two classes, either eating ($c_0$) or non-eating ($c_1$). Each $P(c_i)$ is set at 0.5, and the probabilities of each feature is modeled given each class using a normal distribution, i.e., $$P(f_j | c_i) = \frac{1}{\sqrt{2\pi\sigma_{i,j}^2}} \exp\left(-\frac{(f_j - \mu_{i,j})^2}{2\sigma_{i,j}^2}\right)$$

wherein
$\mu_{i,j}$ is the mean of feature j for class i
$\sigma_{i,j}^2$ is the variance of feature j for class i Devices and methods according to the present disclosure thus advantageously automatically detect eating activities. Further, the devices and methods allow full freedom of motion and activities, and provide increased social acceptance, due to the utilization of a portion of a subject's arm, such as a the wrist. Still further, devices and methods according to the present disclosure have been shown to provide improved and more accurate performance than previously known devices and methods that utilized, for example throat, ear, neck, and/or torso sensors.

The disclosed method can beneficially be utilized to detect entire periods of eating (i.e. meals, snacks) as opposed to counting individual swallows, chews, bites or specific gestures during eating. Previously known methods as discussed above have made progress toward the goal of using body-worn sensors to automatically measure eating events. However, when operated all day, all of these methods face the challenge of false positives occurring during non-eating activities. The presently disclosed method described can be used as an automated on/off switch for such previously known methods, activating any of these methods only during a detected meal/snack. This has the potential to greatly reduce the incidence of false positives in all-day automated eating event recognition.

The presently disclosed methods and devices can also be utilized during free-living, as compared to scripted eating activities in the lab as have been utilized in the past. These devices and methods are body-worn sensors that can detect eating activities in free-living conditions. Although previously known lab studies offer a controlled environment in which eating period detection can be objectively confirmed by video recording or direct observation, body-worn sensors that detect eating are designed with the ultimate intention of being used in free-living. Thus, disclosed methods and devices can record the actual activities of subjects in order to evaluate the automated methods. One advantage of studying eating in free-living is that eating behaviors, schedules and activities are as natural as possible.

Beneficially, the disclosed method has been tested as described below on the largest data set (449 total hours) that has been reported in the related literature. This is partly due to the fact that eating occurs much less frequently than non-eating in freeliving. In the below described data sets, 22.4 hours of eating was observed out of 449 total hours, a ratio of 1 to 20. In contrast, previous works that used data collected in the lab were based on an unrealistic equal ratio of eating and non-eating data. This confounds comparisons of accuracies between these methods and the results reported here. As shown in the below described examples, using equal weighting for eating and non-eating data achieves 95% accuracy for a classifier that blindly labels all data as non-eating; this is obviously not desirable. Described methods can be utilized to achieve high accuracy in laboratory testing application, for instance in the below examples, 81% accuracy was achieved in classifying 1 second epochs as eating or non-eating at a more realistic 20:1 weighting that more closely conforms to actual behavior.

As described above, one envisioned embodiment of the device is a small watch-type worn on the wrist. This configuration is simple, and potentially less embarrassing than previously known systems (compared for example to head mounted sensors), which has implications for long-term use in free-living. In practice devices can be designed to recover and store one or multiple days of data or alternatively only until the current data segment was classified, which could greatly reduce the needed memory. The device can also power certain of the sensors (e.g., the gyroscopes utilized to detect and analyze individual features) during data segments suspected of containing eating activity. This can be greatly beneficial because a MEMS accelerometer uses approximately 10% of the power of a MEMS gyroscope; a typical coin-sized battery can power a single MEMS gyroscope for part of one day, while it can power an accelerometer (used to detect the potential eating events of low activity between periods of higher activity) for over one week.

Another application for the method is the automated measurement of a daily pattern of eating activities. Daily patterns are known to be associated with variations in energy intake. For example, night eating syndrome is characterized by evening hyperphagia and morning anorexia. Different studies have found varying links between night eating syndrome and obesity and other disorders. One factor inhibiting study is the difficulty of objectively quantifying and measuring diagnostic criteria involving eating patterns. Binge eating disorder and eating disorders linked to night shift working are other problems associated with temporal eating patterns. The disclosed methods have the potential to provide an objective eating activity calendar for studying these types of problems.

The disclosed device and method may be better understood with reference to the examples, set forth below.

Example 1

An iPhone® 4 (Apple Inc., 1 Infinite Loop, Cupertino, Calif. 95014) was used to collect raw data. This device was chosen because it contains 3-axis accelerometers and gyroscopes, so it can track both linear and rotational movement. It has a sufficiently large memory (16 GB) to store continuous data for an entire day, and its battery is sufficiently large (1420 mAh) to power data collection for up to 10 hours. The iPhone 4 was fixed to a wristband, and the subject wrapped the band tightly around the forearm to ensure that it did not slide around the arm. The top of the device was aligned with the wrist joint but positioned so that it would not inhibit movement of the wrist. A custom program was utilized to record the raw acceleration readings along the x, y, z axes and the raw rotation readings around the pitch, yaw, and roll axes at a rate of 60 Hz. The data was stored on the device and later transferred to a computer through a USB port.

A group of 30 subjects was utilized in the test. 12 subjects were male and 18 were female. Ages ranged from 18 to 32. Subjects were given the device in a brief laboratory visit prior to the day of recording, and were instructed in its use. They were asked to start the custom program soon after waking in the morning, and to conduct all activities throughout the day as naturally as possible while the device continuously recorded their wrist motion. Subjects were asked to remove the device when engaging in activities that could damage it, such as taking a shower or playing contact sports. Subjects were also instructed to manually record eating activities in a provided log book (5 cm×14 cm) using the time displayed on the device for reference.

A total of 78 eating activities were manually logged by all users, of which 35 (from 20 subjects) were deemed usable for purposes of the study. Table 1 below lists the reasons for exclusion:

TABLE 1

Usability of Manually Logged Eating Activities

| Category | Occurrences |
| --- | --- |
| Total manually logged eating activities | 78 |
| Usable eating activities | 35 |
| Subject forgot to manually log start or stop time | 4 |
| Motion data was not recorded during manually logged entry | 8 |
| Activity duration is too short (less than 3 minutes) | 3 |
| Activity duration is too long (more than 30 minutes) | 9 |
| Subject started or stopped recording less than 10 minutes before or after eating | 18 |
| Logged eating activity is inside another logged eating activity | 1 |

We set an upper bound on duration of 30 minutes and a lower bound on duration of 3 minutes for an eating activity. The upper bound is based on data from a 2010 American Time Use Survey, which shows that Americans spend on average 1.25 hours eating and drinking per day. Dividing this time by three meals per day, even without considering snacks, suggests an average of less than 30 minutes per meal. The lower bound was set to exclude mere periods of brief consumption which may not constitute entire eating activities.

Figure 7:
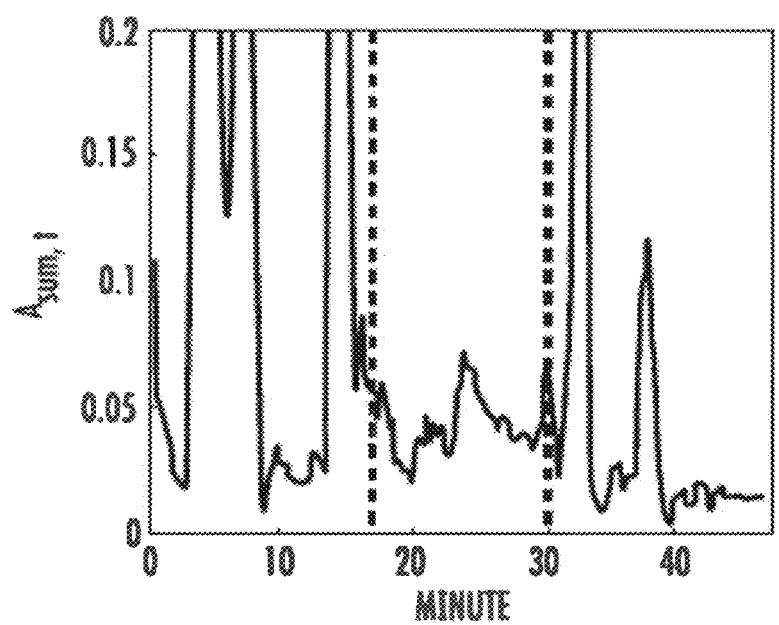
FIG. 7 is a graph indicating an example of wrist motion activity during a single eating activity.
Figure 8:
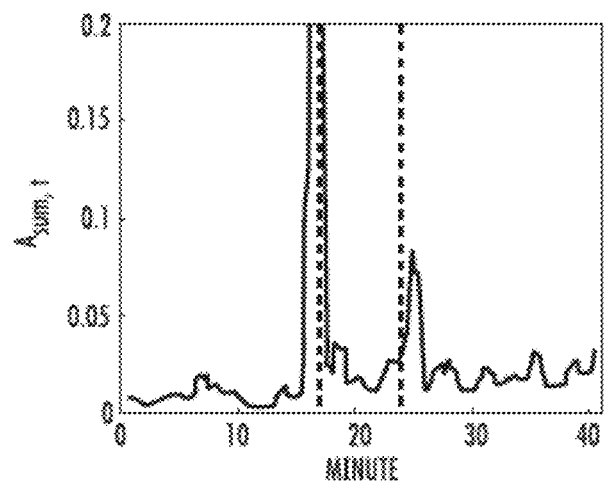
FIG. 8 is another graph indicating an example of wrist motion activity during a single eating activity.

Pre-processing of raw data was performed as discussed above. Detection of eating activities was then performed utilizing the algorithm steps as disclosed above. The time limit between time a and time b was approximately 10 minutes or less. The time limit between time b and time c was approximately 3 minutes or more and approximately 30 minutes or less. The time limit between time c and time d was approximately 10 minutes or less. The time limit between time b and time c was approximately 3 minutes or more and approximately 30 minutes or less. The predetermined multiplier was 2.5. The threshold value K was 0.9 m/s² for accelerometer data and 50 deg/s for gyroscope data. FIGS. 7 and 8 illustrate examples of raw data collected that indicate eating activity occurrences. Hypothesized eating activities based on the algorithm were compared with actual eating activities as manually recorded.

Classification methods were utilized to determine the discriminatory power of the various measurements of the gyroscope and accelerometer sensors. A Fisher linear discriminant ("FLD") was utilized. All the hypothesized detected eating activities were grouped into either actual eating activities or non-eating activities, using the manual logs provided by subjects. For each movement (pitch, roll, yaw, along x-axis, along y-axis, and along z-axis), we calculated $\mu_m$ and $\sigma^2_m$ as the mean and variance of the feature for all eating activities, $\mu_n$ and $\sigma^2_n$ as the mean and variance of the feature for non-eating activities. The FLD was then calculated as:

$$J = \frac{|\mu_m - \mu_n|^2}{\sigma_m^2 + \sigma_n^2}$$

A higher FLD indicates the feature has better discriminatory power (is better for classification). We selected sets of features having higher FLD values and used a Bayes classifier.

The Bayesian approach to classification is to assign the most probable class $v_{MAP}$, given feature values a1, a2, . . . , aN as shown in the following equation:

$$v_{MAP} = \underset{v_j \in V}{\operatorname{argmax}} P(v_j \mid a_1, a_2, \ldots, a_N)$$

V is the class space, either eating activity or non-eating activity. Using Bayes theorem, this equation can be rewritten as:

$$v_{MAP} = \underset{v_j \in V}{\operatorname{argmax}} \frac{P(v_j) P(a_1, a_2, \ldots, a_N \mid v_j)}{P(a_1, a_2, \ldots, a_N)}$$

In practice, only the numerator of the above equation is of value, because the denominator does not depend on $v_j$. The Bayes classifier is based on the simplifying assumption that the attribute values are conditionally independent. Thus, the model can be expressed using the below equation:

$$v_{MAP} = \underset{v_j \in V}{\operatorname{argmax}} P(v_j) \prod_i P(a_i \mid v_j)$$

$P(v_j)$ for both eating activity and non-eating activity was set at 0.5. For each feature, the $P(a_i|v_j)$ is computed by plugging $a_i$ into the equation for a normal Gaussian distribution as follows:

$$P(a_i \mid v_j) = \frac{1}{\sqrt{2\pi\sigma_{a,i}^2}} e^{-\frac{(a_i - \mu_{a,i})^2}{2\sigma_{a,i}^2}}$$

where $\mu_{a,i}$ is the mean of the value in feature $a_i$ associated with class $v_j$ and $\sigma^2_{a,i}$ is the variance of the value in feature $a_i$ associated with class $v_j$.

Evaluation of the detection of eating activity occurrences and evaluation of classification procedures was performed separately. For purposes of detection, if the detected eating start time is within 15 minutes of the actual eating start time, the detected eating stop time is within 15 minutes of the actual eating stop time, and the total absolute error at both boundaries is less than 20 minutes, this activity is classified as correctly detected. Otherwise, the hypothesized detection is classified as a false positive. These values were chosen in order to allow for some error in when subjects manually logged times, as well as to allow for some ambiguity in how a subject interpreted the beginning or ending of actual consumption. All the remaining actual eating activities which are not paired with any detected eating activity are classified as undetected.

The accelerometer detected 31 actual eating activities, with 203 false detections and 4 undetected. The gyroscope detected 31 actual eating activities, with 267 false detections and 4 undetected. Detailed information regarding each actual eating activity is shown in Table 2 below:

TABLE 2

Detection of Actual Eating Activities (in minutes)

| # | Meal Start time | Meal Stop time | Detected by accelerometer Start time | Detected by accelerometer Stop time | Detected by gyroscope Start time | Detected by gyroscope Stop time | Total error by accelerometer | Total error by gyroscope |
|---|---|---|---|---|---|---|---|---|
| 1 | 71.1 | 81.8 | 61.0 (−10.1) | 80.8 (−1.0) | | | 11.0 | |
| 2 | 405.1 | 418.2 | 403.8 (−1.4) | 411.0 (−7.2) | 404.0 (−1.1) | 411 (−7.2) | 8.6 | 8.3 |
| 3 | 198.5 | 208.1 | 197.9 (−0.6) | 207.9 (−0.2) | 198.0 (−0.5) | 208.3 (0.1) | 0.8 | 0.6 |
| 4 | 53.5 | 58.4 | 53.3 (−0.2) | 58.9 (0.6) | 53.3 (−0.2) | 58.4 (0.1) | 0.7 | 0.3 |
| 5 | 139.5 | 152.5 | 135.5 (−4.0) | 457.3 (4.7) | 135.4 (−4.1) | 157.2 (4.6) | 8.7 | 8.7 |
| 6 | 561.4 | 568.4 | 558.3 (−3.1) | 571.3 (2.8) | 55.2 (−3.3) | 571.3 (2.9) | 5.9 | 6.2 |
| 7 | 244.1 | 249.5 | | | | | | |
| 8 | 83.4 | 89.2 | 82.6 (−0.8) | 93.0 (3.8) | 82.7 (−0.8) | 93.2 (4.0) | 4.6 | 4.7 |
| 9 | 152.5 | 165.8 | 150.6 (−1.9) | 167.1 (1.3) | 151.3 (−1.2) | 164.8 (−1.0) | 3.2 | 2.2 |
| 10 | 251.2 | 278.4 | | | 262.2 (11.0) | 275.6 (−2.8) | | 13.8 |
| 11 | 99.0 | 111.3 | 104.7 (5.7) | 110.8 (−0.5) | 104.1 (5.1) | 110.9 (−0.4) | 6.2 | 5.4 |
| 12 | 134.6 | 151.1 | 134.4 (−0.2) | 151.0 (−0.1) | 134.4 (−0.2) | 150.6 (−0.5) | 0.3 | 0.7 |
| 13 | 393.4 | 415.8 | 393.1 (−1.2) | 415.3 (−0.5) | 393.1 (−1.2) | 414.8 (−1.0) | 1.7 | 2.2 |
| 14 | 38.8 | 52.1 | 38.1 (−0.7) | 45.6 (−6.5) | 38.5 (−0.3) | 45.7 (−6.5) | 7.2 | 6.7 |
| 15 | 43.1 | 57.3 | 43.5 (0.4) | 56.6 (−0.7) | 43.5 (0.4) | 56.5 (−0.8) | 1.1 | 1.2 |
| 16 | 39.8 | 58.8 | 41.9 (2.2) | 48.3 (−0.5) | 42.0 (2.2) | 48.3 (−0.5) | 2.6 | 2.7 |
| 17 | 199.7 | 226.7 | 205.6 (5.9) | 228.8 (−3.8) | 205.3 (5.7) | 222.8 (−3.8) | 9.7 | 9.5 |
| 18 | 114.3 | 121.3 | 114.2 (−0.1) | 121.3 (0.1) | 114.1 (−0.2) | 121.8 (0.5) | 0.2 | 0.7 |
| 19 | 116.0 | 129.0 | 123.7 (7.7) | 139.7 (10.7) | 116.3 (0.3) | 139.8 (10.8) | 18.3 | 11.1 |
| 20 | 233.5 | 246.0 | 233.0 (−0.5) | 246.8 (0.8) | 233.2 (−0.3) | 247.7 (1.6) | 1.3 | 2.0 |
| 21 | 177.1 | 186.2 | 170.4 (−6.7) | 190.6 (4.4) | 170.5 (−6.6) | 190.6 (4.4) | 11.1 | 11.1 |
| 22 | 17.8 | 30.6 | 16.0 (−1.8) | 30.3 (−0.2) | 16.0 (−1.8) | 26.8 (−3.8) | 2.0 | 5.6 |
| 23 | 129.9 | 140.2 | 129.1 (−0.9) | 139.8 (−0.4) | 129.0 (−0.9) | 139.9 (−0.3) | 1.2 | 1.2 |
| 24 | 133.6 | 144.6 | | | | | | |
| 25 | 20.6 | 27.7 | 19.3 (−1.3) | 34.9 (7.2) | 19.7 (−0.9) | 34.8 (7.2) | 8.5 | 8.0 |
| 26 | 54.5 | 66.9 | 54.1 (−0.4) | 66.5 (−0.4) | 54.0 (−0.5) | 66.4 (−0.4) | 0.8 | 1.0 |
| 27 | 50.6 | 54.3 | 49.8 (−0.6) | 54.3 (0.1) | 49.8 (−0.6) | 54.3 (0.0) | 0.7 | 0.6 |

TABLE 2-continued

Detection of Actual Eating Activities (in minutes)

| # | Meal Start time | Meal Stop time | Detected by accelerometer Start time | Detected by accelerometer Stop time | Detected by gyroscope Start time | Detected by gyroscope Stop time | Total error by accelerometer | Total error by gyroscope |
|---|---|---|---|---|---|---|---|---|
| 28 | 121.2 | 127.4 | 115.0 (−6.2) | 126.3 (−1.1) | | | 7.2 | |
| 29 | 534.3 | 562.6 | 537.5 (3.2) | 548.9 (−13.7) | 535.9 (1.6) | 551.8 (−10.9) | 16.9 | 12.5 |
| 30 | 319.5 | 330.4 | 317.8 (−1.6) | 331.6 (1.2) | 317.8 (−1.6) | 331.6 (1.2) | 2.9 | 2.9 |
| 31 | 10.4 | 17.1 | 9.0 (−1.4) | 24.4 (7.3) | 7.3 (−3.2) | 24.4 (7.3) | 8.7 | 10.5 |
| 32 | 187.7 | 194.7 | 184.9 (−2.8) | 197.8 (3.2) | 193.2 (5.5) | 197.8 (3.1) | 5.9 | 8.6 |
| 33 | 323.7 | 327.7 | 326 (2.3) | 330.2 (2.5) | 326.1 (2.4) | 330.3 (2.7) | 4.8 | 5.1 |
| 34 | 121.3 | 129.4 | 121.8 (0.5) | 136.8 (7.4) | 122.4 (1.1) | 136.8 (7.4) | 17.0 | 8.5 |
| 35 | 332.5 | 348.8 | | | 338.7 (6.2) | 343.3 (−5.5) | | 11.7 |
| Average | | | | | | | 5.5 | 5.6 |

Based on these results, because both accelerometers and gyroscopes had the same number of detections and undetected activities, because accelerometers had fewer false positives, and because accelerometers utilize less power than gyroscopes, it was determined that accelerometers may in some embodiments be preferable to gyroscopes for use as sensors for purposes of data segmentation.

For classifying activities, we use a 5 folder cross validation scheme to evaluate the accuracy. In this scheme, the detected activities are randomly partitioned into five subgroups. For each experimental run, one of the subgroups is used as the testing data set and the other four subgroups are used as the training data set. This process is repeated five times with each subgroup being used exactly once as the test data set. The classification accuracy was then averaged to produce a final result.

Table 3 shows the FLD of all the gyroscope features for the detected activities. The true positive and false positive rates are shown for classification using the Bayesian method from the single feature. Table 4 shows the FLD of all the accelerometer features for the detected activities. This table also shows the true positive and false positive rates if each feature is used individually for classification.

TABLE 3

FLD of gyroscope features

| Gyroscope feature | FLD | TP | FP |
|---|---|---|---|
| Mean absolute deviation of yaw | 0.44 | 22 | 63 |
| Mean absolute deviation of pitch | 0.43 | 23 | 61 |
| Mean absolute deviation of roll | 0.78 | 22 | 43 |
| Regularity of yaw motion | 1.04 | 26 | 53 |
| Regularity of pitch motion | 0.80 | 25 | 52 |
| Regularity of roll motion | 1.08 | 24 | 55 |
| Gyroscope line fit. | 0.00 | 18 | 80 |
| Bite count | 0.74 | 25 | 58 |
| Mean of bite interval | 0.16 | 23 | 74 |
| Variance of bite interval | 0.01 | 24 | 93 |
| Skewness of bite interval | 0.32 | 16 | 50 |

TABLE 4

FLD of accelerometer features

| Accelerometer feature | FLD | TP | FP |
|---|---|---|---|
| Mean absolute deviation of x | 0.05 | 21 | 111 |
| Mean absolute deviation of y | 0.00 | 26 | 133 |
| Mean absolute deviation of z | 0.00 | 24 | 117 |
| Regularity of x motion | 0.26 | 28 | 124 |
| Regularity of y motion | 0.26 | 28 | 112 |
| Regularity of z motion | 0.28 | 27 | 109 |
| Accelerometer line fit. | 0.01 | 13 | 86 |

Comparing Table 3 and Table 4, we find that the FLD values for the gyroscope features are in general much higher than for the accelerometer features. As a result, the gyroscope features have higher true positive rates and much smaller false positive rates than the accelerometer features. In addition, the roll axis shows much higher FLD values than the other axes.

For each number of features N, we tried all combinations with the highest N+2 FLD values. Table 5 shows the result of classification of some of the best of these combinations.

TABLE 5

Result of classification using gyroscope feature sets
(mad = mean absolute deviation; var = variance;
reg = regularity of motion)

| Gyroscope feature | Total features | True detection | False detection | Undetected |
|---|---|---|---|---|
| Reg yaw, reg roll | 2 | 25 | 54 | 6 |
| Mad roll, reg roll | 2 | 26 | 46 | 5 |
| Reg yaw, reg pitch, reg roll | 3 | 27 | 54 | 4 |
| Mad roll, reg roll, bite count | 3 | 27 | 47 | 4 |
| Mad roll, reg yaw, reg pitch, reg roll | 4 | 27 | 51 | 4 |
| Mad roll, var roll, reg roll, bite count | 4 | 24 | 43 | 7 |
| Mad roll, reg yaw, reg pitch, reg roll, bite count | 5 | 27 | 49 | 4 |
| Mad roll, var roll, reg roll, line fit, bite count | 5 | 23 | 43 | 8 |

Table 5 illustrates that an increase beyond two features does not improve the result. We can also conclude that using only the data along the roll axis shows the best result. Specifically, when we only use mean absolute deviation of roll and regularity of roll, we get 26 true detections and 46 false detections. Based on these results, it was determined that gyroscopes may in some embodiments be preferably to accelerometers for use as sensors for classification.

These results suggest a general pattern of wrist motion related to an eating activity, consisting of a burst of activity at the beginning and end, with a period of lesser motion in-between. Further, these results suggest devices and methods utilizing accelerometers that are powered continuously to detect movement that may indicate the beginning of an eating activity occurrence, with gyroscopes powered only during the detected periods in order to increase classification accuracy.

Example 2

An iPhone® 4 (Apple Inc., 1 Infinite Loop, Cupertino, Calif. 95014) was used to collect data to develop and evaluate an algorithm. The iPhone was placed inside a pouch that could be wrapped snugly around the forearm. The top of the device was aligned with the wrist joint but positioned so that it would not inhibit movement of the wrist. A program was written to run on the iPhone, recording the raw data for later transfer to a computer through a USB port. The segmentation and classification algorithms as described above were implemented in the C programming language using a Win32 graphical user interface to visualize the data and results. For smoothing sensor data from the iPhone, it was found that a window size N of 1 second with a Gaussian sigma R of 10 produced good results.

Subjects were given the device in a brief laboratory visit prior to the day of their recording, and were instructed in its use. They were asked to put the device on and start the custom program soon after waking in the morning, and to conduct all activities throughout the day as naturally as possible while the device continuously recorded their wrist motion. Subjects were asked to remove the device only when engaging in activities that could damage it, such as taking a shower. On the day following recording, each subject returned the iPhone® to the experimenter for data download and review.

Data was collected in two separate batches. In the first batch, 30 subjects (12 male, 18 female, ages 18-32) were instructed to manually write down the start and stop times of their actual meals and snacks in a provided log book, using the time displayed on the device for reference. The iPhone® program recorded data at 60 Hz and drained the battery after approximately 8.5 hours. Subsequent to this batch, it was learned that 15 Hz data was sufficient for the method, and were able to extend recording time to approximately 12 hours. It was also learned that subjects had trouble using the provided written log to record the times of eating. The manually written log was therefore discontinued and instead an event marker button was added to the program that subjects were instructed to press when they started and ended meals or snacks. The function that allowed participants to halt/resume recording was also removed, to avoid confusion.

In the second batch of data collection, 25 subjects (8 male, 17 female, ages 20-50) used the updated version of the program.

During post-review, the experimenter interviewed each subject to identify possible errors for exclusion. Out of the first batch of 30 recordings, 10 had to be discarded due to poor compliance with keeping records. Two subjects forgot to write down start or stop times for 1 or more meals/snacks. Three subjects stated that they filled the log out at the end of the day based upon memory, instead of writing down the start and stop times as they occurred. Five subjects misinterpreted the instructions and started/stopped the recording program for meals only. These problems motivated the reprogramming of the recording program to remove the halt/resume button, and to include an event marker on the screen in place of using a written time log. For the second batch of 25 recordings, button press logs were reviewed with subjects the day after recording to eliminate inadvertent markers. Out of 294 total marks, 172 recorded 86 discrete, verified eating activities with event marks at the actual start and stop boundaries as verified by the participants. Most of the remaining 122 marks were identifiable as inadvertent due to being single marks (as opposed to marks that could be paired into start/stop sets). Given the sensitivity of the touchscreen, the size of the event marker button (5×2 cm), and the fact that each subject wore the device for a whole day, this number of inadvertent presses was not surprising. Nine marks were reported as intentional by the subjects to test that the device was still recording, but were not associated with meals. Six marks were identified as double presses of the button due to being less than 10 seconds apart. Two subjects reported forgetting to press the button at the end of one or more meals; these recordings were discarded. In total, our data collection yielded 449 hours of data from 43 subjects, including a cumulative 22.4 hours of eating over 116 total meals/snacks. The goal of the data collection was to capture a sample of eating activities covering a variety of individuals, meals, environments and times of day. The purpose of the data set was to enable algorithm development for automatically detecting such periods. It was not a goal of the data collection to capture total daily intake. We asked that participants try to capture all their eating activities, but the goal of this work was not contingent on meeting this.

Two sets of evaluation metrics were used. The first metrics evaluated the classifier by the total amount of time correctly classified, the second metrics evaluated the classifier by the total amount of eating activities (segments) correctly classified. The boundaries of manually logged periods of eating were recorded at 1 second resolution. The boundaries of automatically classified periods of time were rounded to the nearest second. For the first metrics, true positives (TP) were counted as the number of seconds of time that were labeled as eating in the manual logs and classified as eating. False positives (FP) were counted as the number of seconds of time that were labeled as non-eating in the manual logs and classified as eating. True negatives (TN) and false negatives (FN) were counted similarly by comparing the manual log labels to the data classified as non-eating. Sensitivity and specificity were calculated as TP/(TP+FN) and TN/(TN+FP). Accuracy was calculated as:

Accuracy=(TP×20+TN)/((TP+EN)×20+(TN+FP))

The factor of 20 in this equation weights true positives to true negatives at a ratio of 20:1. This was used because eating occurs much less frequently than non-eating in general free-living. The benefit of using 20:1 weighting during evaluation was demonstrated in the results.

For the second metrics, consecutive segments that were labeled as eating by the classifier were merged into single whole segments. True detections were counted as the number of manually logged entries that overlapped segments that were labeled eating by the classifier. Undetected eating activities were counted as the remainder of the manually logged entries. False detections were counted as the remainder of the segments that were labeled eating by the classifier.

The classifier was trained using leave-one-out cross validation. Thus, for testing each of the 43 recordings (1 per person), the classifier was trained using the other 42 recordings to calculate values for the classifier probabilities ($\mu_{i,j}$ and $\sigma_{i,j}$). Table 6 lists the average means and variances for the features for each class. The notation $f_i$ was used to refer generically to the feature manipulation (see above discussion), and $f_{i,w}$ to refer to that feature calculated over a specific window W. The probabilities for the eating class $c_0$ were calculated as the average feature values for all segments labeled as eating by the subjects. For the non-eating class, $c_1$, all the remaining data from the recordings was broken into 5 minute windows and the probabilities were calculated as the average feature values.

TABLE 6

Average Feature Values Found During Training

| Notation | Feature | Eating | | Non-eating | |
|---|---|---|---|---|---|
| | | Mean | Variance | Mean | Variance |
| $f_1$ | Manipulation ((deg/sec)/G) | 791 | 45785 | 395 | 57284 |
| $f_2$ | Acceleration (G) | 0.039 | 0.0002 | 0.054 | 0.0043 |
| $f_3$ | Roll motion (deg/sec) | 9.1 | 18.2 | 6.8 | 39.2 |
| $f_4$ | Roll regularity (% time) | 0.58 | 0.02 | 0.37 | 0.07 |

As can be seen in Table 6, during eating there tends to be higher values for manipulation, roll motion and roll regularity, and lower values for linear acceleration. The variances for all features for the non-eating class are higher than for eating, due to the variety of activities grouped together in this class. Twotailed independent t-tests comparing all paired distributions showed the differences are statistically significant (all p's<0.001).

Table 7 shows the results of testing the classifier using leave-one-out cross validation combined across the two batches of data collected. The accuracy achieved was 79%. Using just the first two features (manipulation and linear acceleration) produced the same accuracy as using all 4 features.

TABLE 7

Results using Leave-one-out Cross Validation on all Data

| Features | Sensitivity | Specificity | accuracy |
|---|---|---|---|
| $f_1, f_2$ | 80% | 79% | 79% |
| $f_1, f_2, f_3, f_4$ | 76% | 82% | 79% |

Since the data was recorded in two batches, the results were also analyzed using separate leave-one-out cross validation for each batch. Specifically, for the 20 recordings in the first batch, each was tested using the other 19 for training the classifier; for the 23 recordings in the second batch, each was tested using the other 22 for training the classifier. Table 8 shows these results. In this case an accuracy of 81% was achieved, and the use of all 4 features improved sensitivity, specificity, and accuracy. It was hypothesized that this was due to the different amounts of data recorded in each batch.

The first batch averaged 8.5 hours per recording, spanning 10 AM to 6:30 PM on average. The second batch averaged 12 hours per recording, spanning 10 AM to 10 PM on average. Since the second set included more evening and night activities, it was supposed that the different training produced more accurate feature values for the classifier.

TABLE 8

Results Using Leave-One-Out Cross Validation Separately on Each of the Two Batches of Data

| Features | Sensitivity | Specificity | accuracy |
|---|---|---|---|
| $f_1, f_2$ | 78% | 79% | 79% |
| $f_1, f_2, f_3, f_4$ | 81% | 82% | 81% |

The values $P(c_0)$, $P(c_1)$ in our classifier (as described above) determined the likelihood of a segment being classified as an eating or non-eating activity. Testing was carried out across the range of values:

$$P(c_0), P(c_1) = \{0,1\}, \{0.05, 0.95\}, \{0.1, \ldots 0.9\}, \{1, 0\}$$

to find the maximum accuracy.

Table 9 shows the importance of weighting accuracy at 20:1 for evaluating total time correctly classified. Weighted at 1:1, the classifier achieved a maximum accuracy of 95% but this occurred at a sensitivity of 0%, in other words when all data are labeled as non-eating. Weighted at 20:1, the classifier achieved a maximum accuracy of 81% which is less than 95%, but the sensitivity and specificity are balanced.

TABLE 9

Evaluation of a Classifier at Maximum Accuracy using 1:1 vs. 20:1 Weighting of Time Correctly Classified as Eating vs. Non-eating

| Weighting | Sensitivity | Specificity | accuracy |
|---|---|---|---|
| 1:1 | 0% | 100% | 95% |
| 20:1 | 81% | 82% | 81% |

The accuracy per person ranged from 35-97%, with a median of 82%. The accuracy was above 70% for 38 out of 43 people (88%), with the five remaining having much lower accuracies. This suggests that for most people, our method may be suitable for detecting eating activities, but that for some people the method may not work. It could be that some people are less likely to engage in vigorous wrist motions before and after eating activities. However, each subject was only recorded for a single day, so this result may be more a function of the particular meals/snacks eaten on the day of recording than individual habits.

The classifier was also evaluated at the segment level using the second set of metrics described above. The classifier correctly detected 100 actual eating activities, missed 16, and had 379 false detections. The average time between the start of manual log entries and correctly detected eating activities was −0.6 minutes. The average time between the end of manual log entries and correctly detected eating activities was +1.5 minutes. This suggests that the peaks detected by the method occur slightly before and slightly after actual eating begins and ends, respectively It will be appreciated that the foregoing examples, given for purposes of illustration, are not to be construed as limiting the scope of this disclosure. Although only a few exemplary embodiments of the disclosed subject matter have been described in detail above, those skilled in the art will readily appreciate that many modifications are possible in the exemplary embodiments without materially departing from the novel teachings and advantages of this disclosure. Accordingly, all such modifications are intended to be included within the scope of this disclosure. Further, it is recognized that many embodiments may be conceived that do not achieve all of the advantages of some embodiments, yet the absence of a particular advantage shall not be construed to necessarily mean that such an embodiment is outside the scope of the present disclosure.

What is claimed is:

1. A device for detecting an eating activity, the device comprising:
   one or more sensors for monitoring movement of a portion of a lower arm of a subject; and
   a processor in communication with the one or more sensors for collecting raw data associated with the movement of the portion of the lower arm, the processor being configured to process the raw data and thereby determine that an eating activity preparation event has occurred, an eating activity cleanup event has occurred, and an eating activity has occurred between the eating activity preparation event and the eating activity cleanup event and form processed data.

2. The device of claim 1, wherein the one or more sensors comprise an accelerometer, the accelerometer monitoring movement along at least one of an x-, y-, or z-axis.

3. The device of claim 1, wherein the one or more sensors comprise a gyroscope, the gyroscope monitoring movement about at least one of an x-, y-, or z-axis.

4. The device of claim 1, wherein the movement of the portion of the lower arm comprises roll motion of the portion of the lower arm.

5. The device of claim 1, wherein the processor further collects raw data associated with a time at which the movement of the portion of the lower arm occurs.

6. The device of claim 1, wherein the portion of the lower arm is a wrist.

7. The device of claim 1, further comprising a memory for storing the processed data.

8. The device of claim 1, the processor being configured to recognize in the raw data a movement pattern that includes a first period of high motion activity that is associated with the eating activity preparation event, a second period of low motion activity that is associated with the eating event, and a third period of high motion activity that is associated with the eating activity cleanup event.

9. The device of claim 8, the processor being configured to recognize and analyze one or more features during the second period of low motion activity.

10. The device of claim 9, the one or more features comprising one or more of manipulation, linear acceleration, amount of wrist roll motion, and regularity of wrist roll motion.

11. The device of claim 9, the one or more features comprising all of manipulation, linear acceleration, amount of wrist roll motion, and regularity of wrist roll motion.

12. A method for detecting an eating activity occurrence, the method comprising:
   mounting one or more sensors on a wearable device, the one or more sensors being configured to sense movement of a portion of a lower arm of a subject wearing the wearable device; and
   configuring a processor to process raw data obtained by the sensors and thereby form processed data, the processing comprising determination that an eating activity preparation event has occurred, determination that an eating activity cleanup event has occurred, and determination that an eating activity has occurred between the eating activity preparation event and the eating activity cleanup event.

13. The method of claim 12, the step of processing the raw data comprising pre-processing the raw data to obtain pre-processed data.

14. The method of claim 13, the step of processing the raw data further comprising segmentation of the pre-processed data.

15. The method of claim 14, the segmentation of the pre-processed data comprising:
   determining that a motion activity meets a threshold value K at a first time a and that the motion activity is increasing as the threshold value K is passed at time a;
   determining that the motion activity meets the threshold value K at a second time b that follows the first time a and that the motion activity is decreasing as the threshold value K is passed at time b;
   determining that the motion activity meets the threshold value K at a third time c that follows the second time b and that the motion activity is increasing as the threshold value K is passed at time c; and
   determining that the motion activity meets the threshold value K at a fourth time d that follows the third time c and that the motion activity is decreasing as the threshold value K is passed at time d.

16. The method of claim 14, the segmentation of the pre-processed data comprising:
   determining a segmented motion energy of the subject by use of the following equation:

$$E_t = \frac{1}{W+1} \sum_{i=t-\frac{W}{2}}^{i=t+\frac{W}{2}} |S_{x,i}| + |S_{y,i}| + |S_{z,i}|$$

wherein
   $E_t$ is a total motion energy of the subject at time t,
   W is a time period window size, and
   $S_{x,i}$, $S_{y,i}$, $S_{z,i}$ are pre-processed acceleration raw data values on the x, y, and z axis at time i.

17. The method of claim 14, the step of processing the raw data further comprising classification of the pre-processed and segmented data to recognize one or more features of the eating activity.

18. The method of claim 17, the one or more features comprising one or more of manipulation, linear acceleration, amount of wrist roll motion, regularity of wrist roll motion, cumulative time spent eating in a day, cumulative time spent eating during the eating activity, and time since last eating activity.

19. The method of claim 18, the one or more features comprising all of manipulation, linear acceleration, amount of wrist roll motion, and regularity of wrist roll motion.

* * * * *